US006355290B1

(12) United States Patent
Soehnlen et al.

(10) Patent No.: US 6,355,290 B1
(45) Date of Patent: *Mar. 12, 2002

(54) ICE CREAM MANUFACTURING AND PACKAGING PROCESS AND A PACKAGE FOR THIS PROCESS

(75) Inventors: Daniel P. Soehnlen, Canton; Gregory M. Soehnlen, North Canton; Dale A. Panasewicz, Strongsville, all of OH (US)

(73) Assignee: Creative Edge Design Group, Ltd., Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,935

(22) Filed: Jan. 15, 2000

Related U.S. Application Data

(63) Continuation-in-part of application No. 09/118,246, filed on Jul. 17, 1998, now Pat. No. 6,103,287.

(51) Int. Cl.[7] .............................. A23G 9/04; B65B 3/00
(52) U.S. Cl. ....................... 426/393; 426/565; 426/524; 53/281; 62/60; 62/63; 62/374; 141/2; 141/9; 141/104; 141/100; 141/83
(58) Field of Search ................................ 426/393, 565, 426/524; 62/60, 63, 64, 374, 380; 141/2, 9, 83, 94, 104, 105, 100; 53/168, 474, 237, 473, 478, 281, 282

(56) References Cited

U.S. PATENT DOCUMENTS

| 2,347,162 A | 4/1944 | Watts .......................... 426/303 |
| 2,909,433 A | 10/1959 | Morrison ..................... 426/393 |
| 3,138,935 A | 6/1964 | Morrison ..................... 426/393 |
| 3,701,263 A | 10/1972 | Barrett ........................... 62/63 |
| 3,797,537 A | 3/1974 | Faessler et al. ............... 141/42 |
| 3,832,827 A | 9/1974 | Lemelson ................. 53/111 R |
| 4,208,852 A | 6/1980 | Pioch ........................... 53/167 |
| 4,318,935 A | 3/1982 | Stussi ......................... 426/576 |
| 4,457,348 A | 7/1984 | Mueller et al. ................. 141/1 |
| 4,494,582 A | * 1/1985 | Meyer ............................ 141/9 |
| 4,535,889 A | 8/1985 | Terauds ...................... 206/527 |
| 4,700,842 A | 10/1987 | Grusin ........................ 206/508 |
| 4,751,805 A | * 6/1988 | Walter ......................... 53/168 |
| 4,803,851 A | 2/1989 | Stokes ......................... 62/374 |
| 4,819,412 A | 4/1989 | Sengewald ................... 53/471 |
| 4,915,230 A | 4/1990 | Mancini ..................... 206/459 |
| 5,098,732 A | 3/1992 | Inagaki ....................... 426/565 |
| 5,713,403 A | * 2/1998 | Clusserath et al. ......... 141/101 |
| 5,771,657 A | * 6/1998 | Lasher et al. .................. 53/55 |
| 6,103,287 A | * 8/2000 | Soehnlen et al. ........... 426/393 |
| 6,119,434 A | * 9/2000 | Andersson ................... 53/537 |
| 6,247,507 B1 | * 6/2001 | Soehnlen et al. .............. 141/2 |

OTHER PUBLICATIONS

Six–page bulletin describing APV Automatic Contact Plate Freezers, Section 16, Bulletin U–1–200 by APV Crepaco, Inc.
One–page document describing Tri–Tray, New Series 5000 Cooling/Freezing System, by Freestech International, Ltd.
Eight–page brochure describing the Woodson System, by Woodson Incorporated, copyrighted in 1987.
Four–page reprint from the Mar. 1989 issue of *Dairy Field*, describing the Woodson System.
Two–page document from AGA, describing Freezing & Cooling Equipment.
Six–page brochure on Sidam Polocup products, dated Oct. 1995, regarding ice cream machinery.
Copies of the bottom and front of a Breyers half–gallon ice cream container.

* cited by examiner

*Primary Examiner*—Milton I. Cano
*Assistant Examiner*—Robert Madsen
(74) *Attorney, Agent, or Firm*—Vickers, Daniels & Young

(57) ABSTRACT

A process for making and packaging multi serving ice cream products using cryogenic hardening of ice cream in consumer containers before the containers are closed and labeled. A plastic tray container which is stable when disposed horizontally or vertically provides better processing and an improved package for both retailers and consumers.

21 Claims, 14 Drawing Sheets

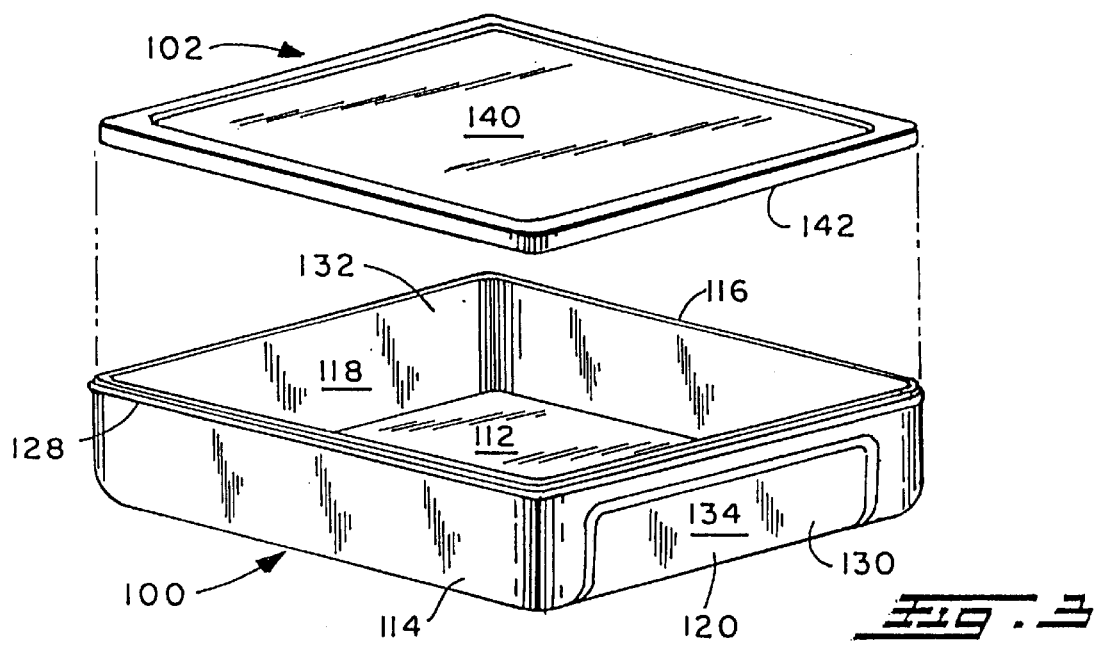
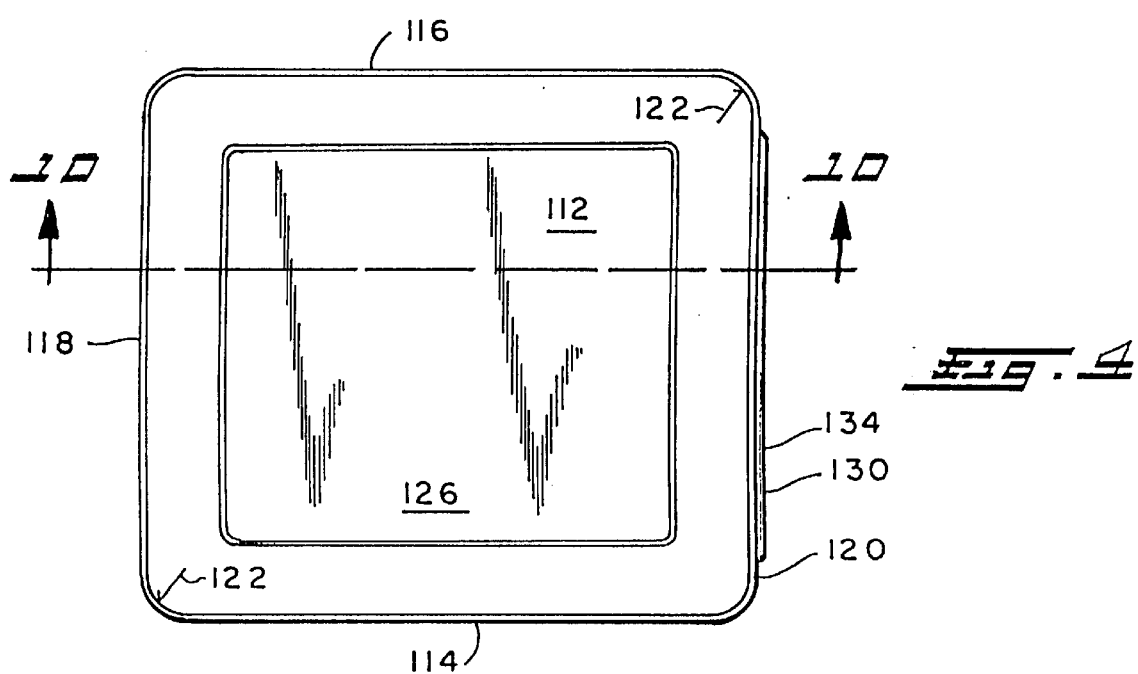
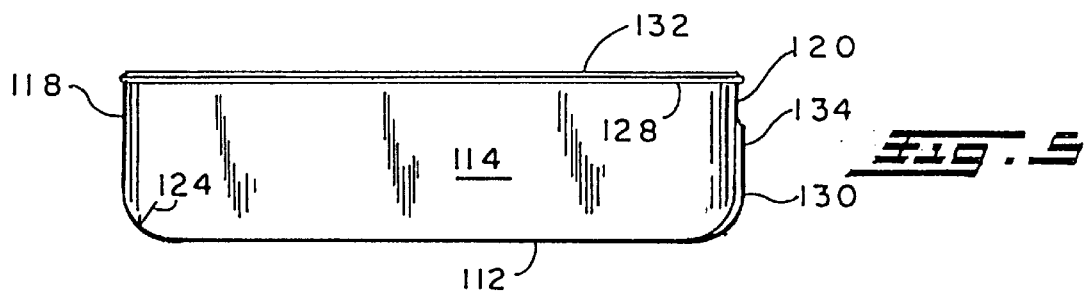

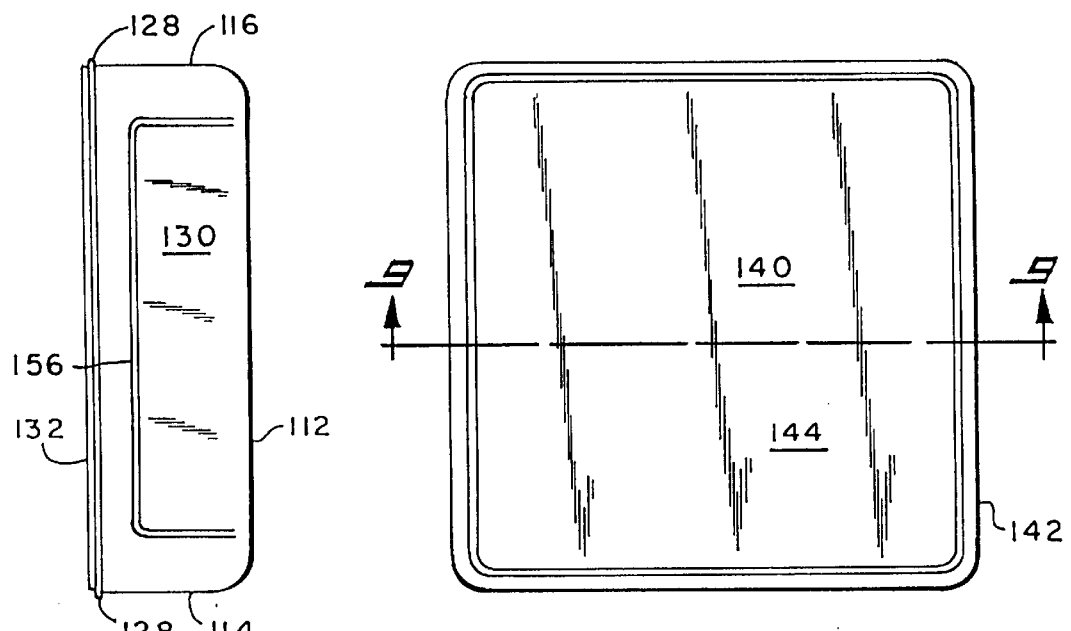
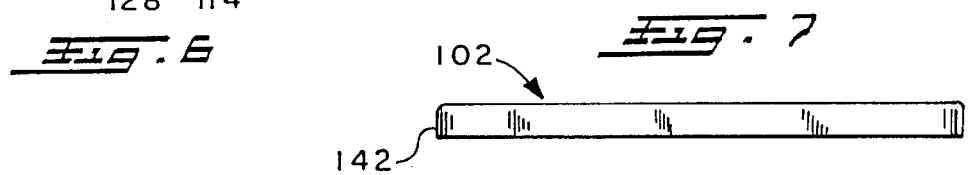
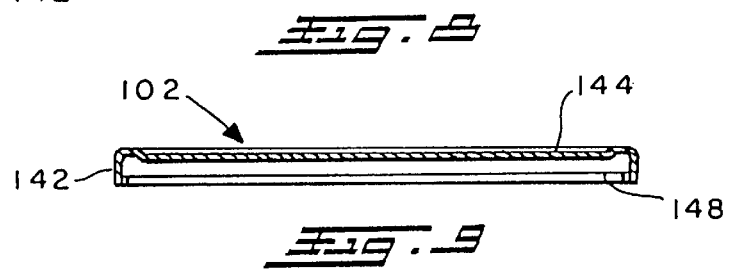
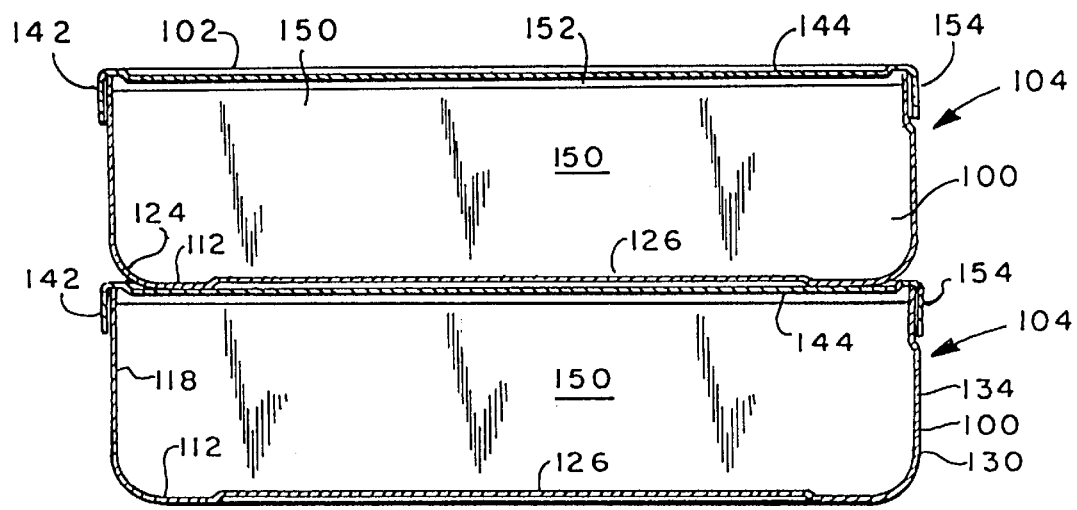

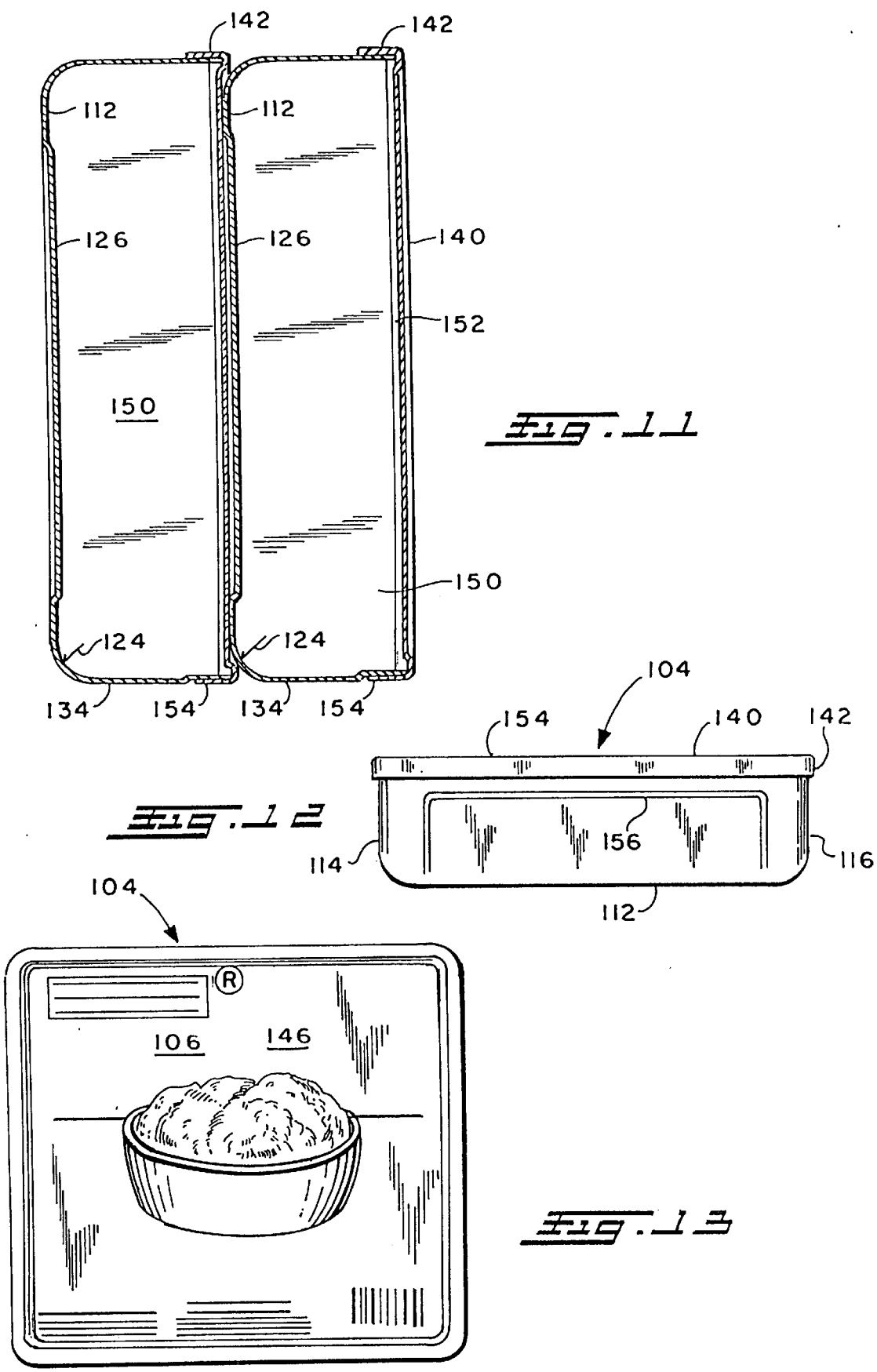

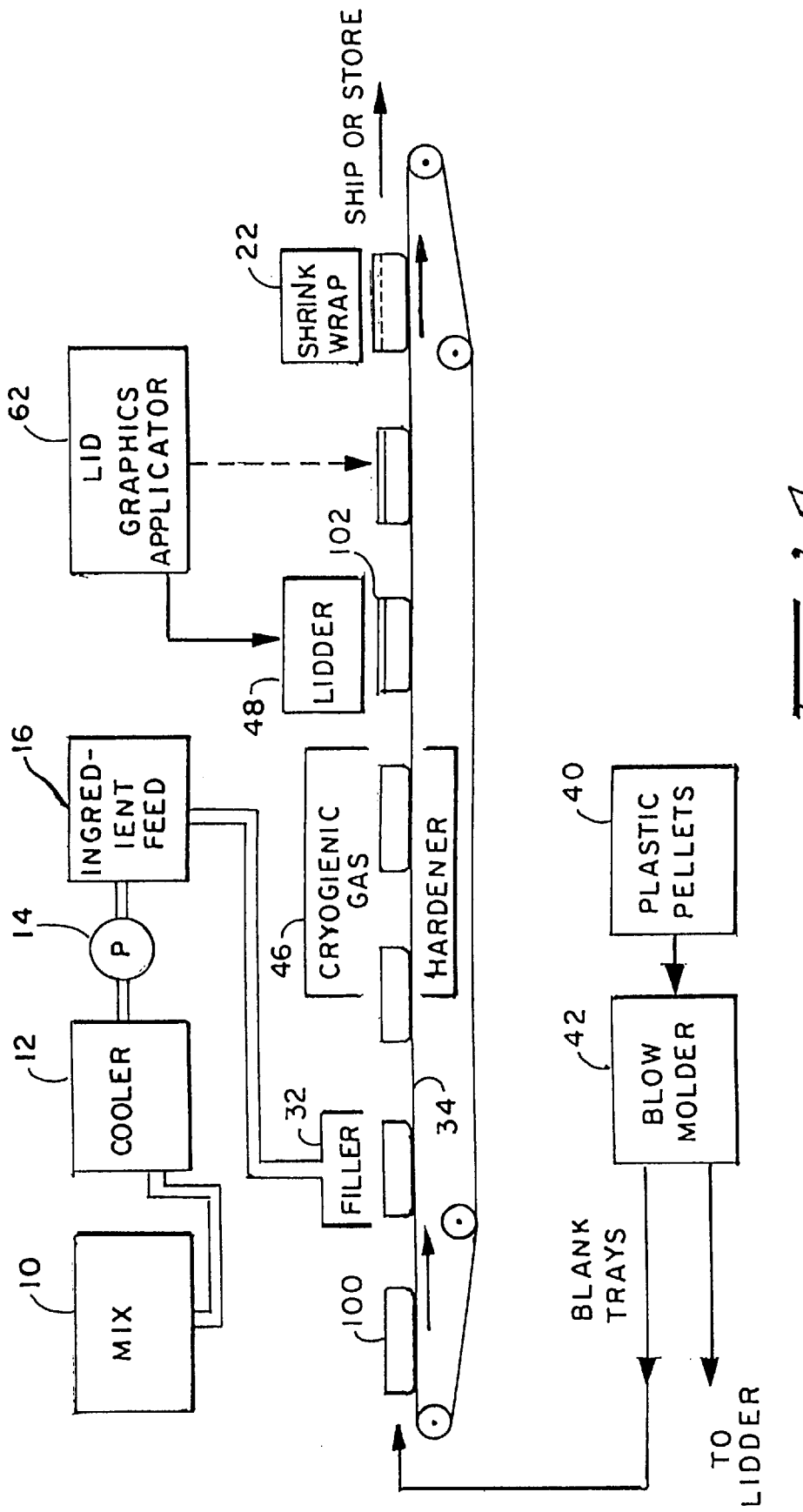

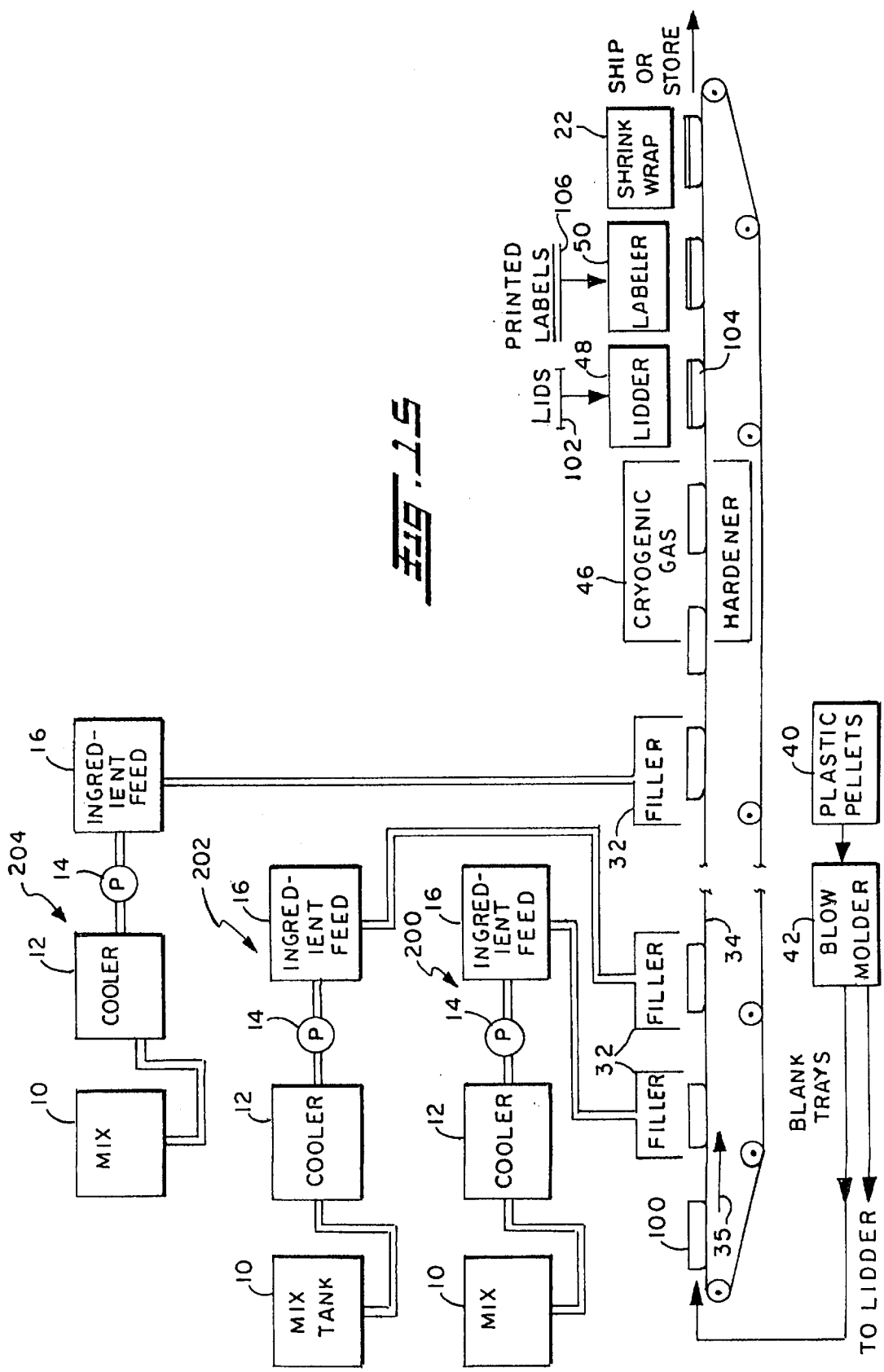

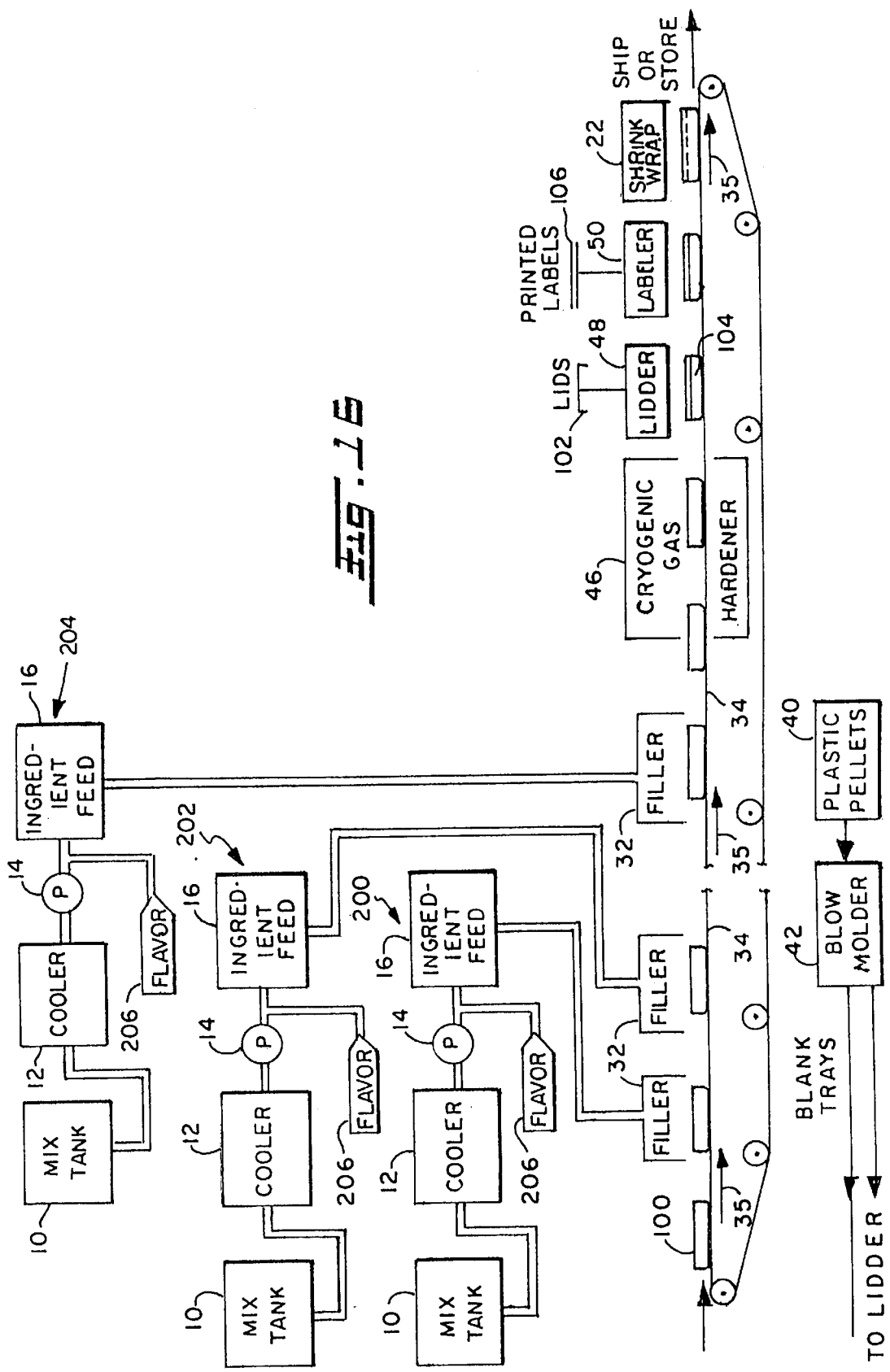

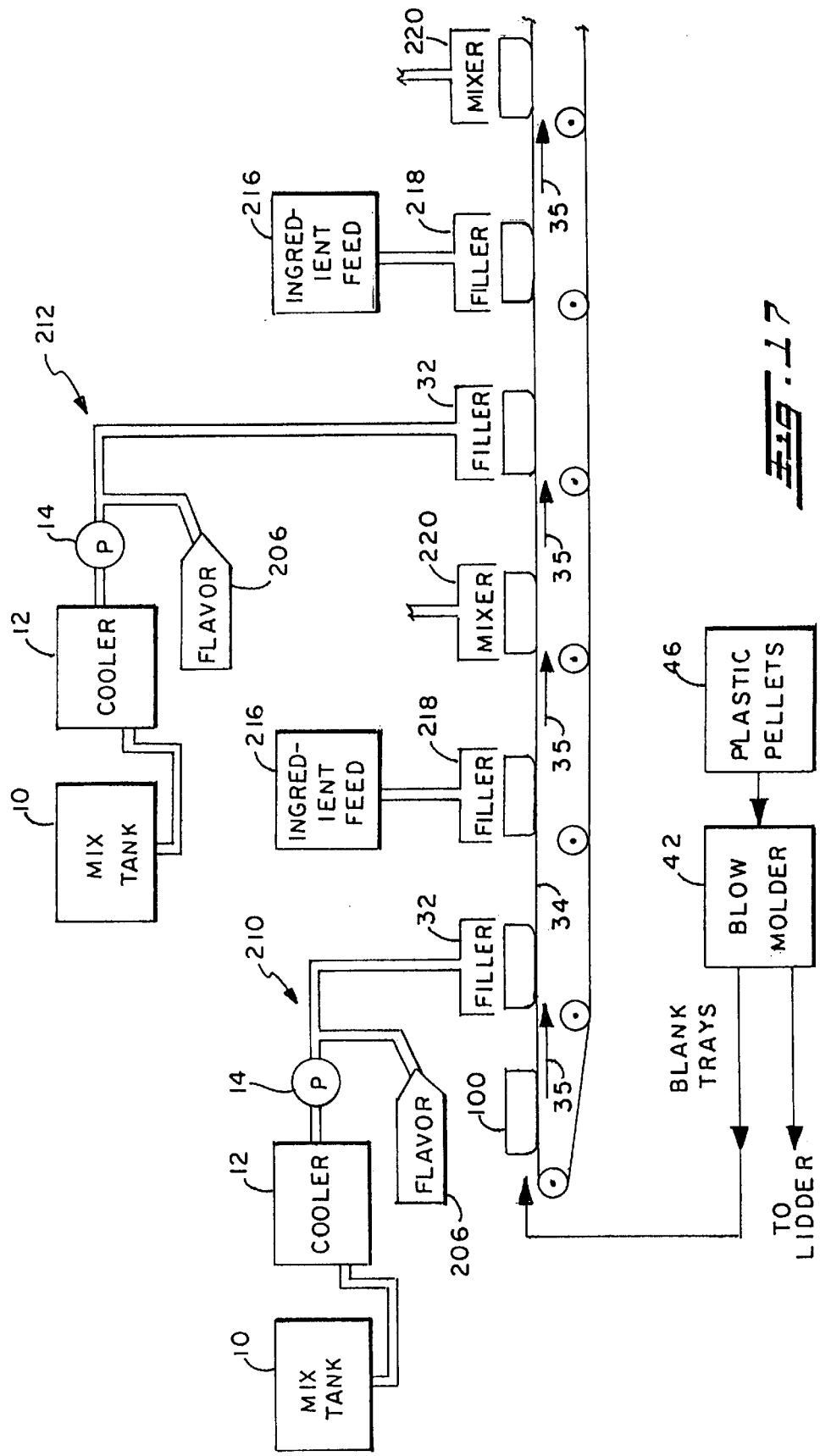

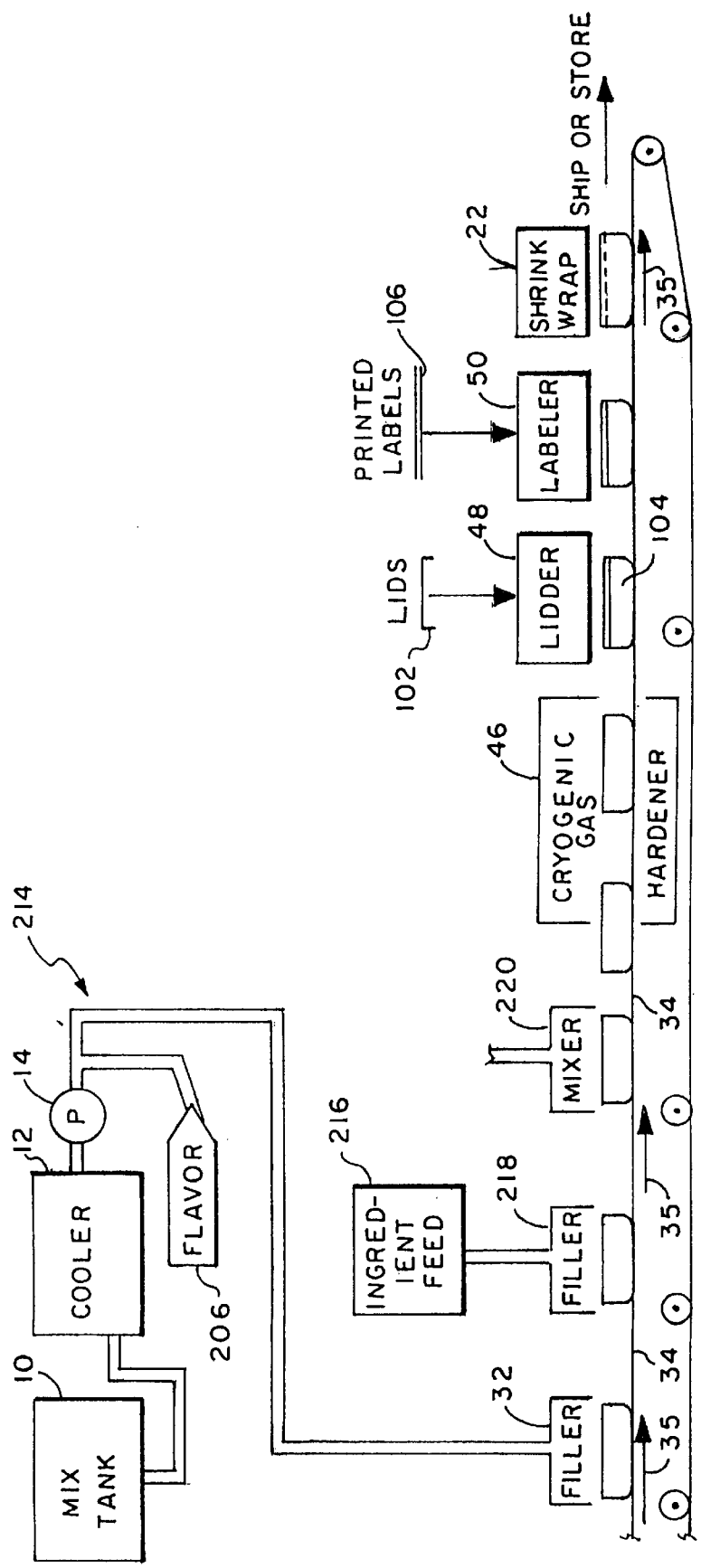

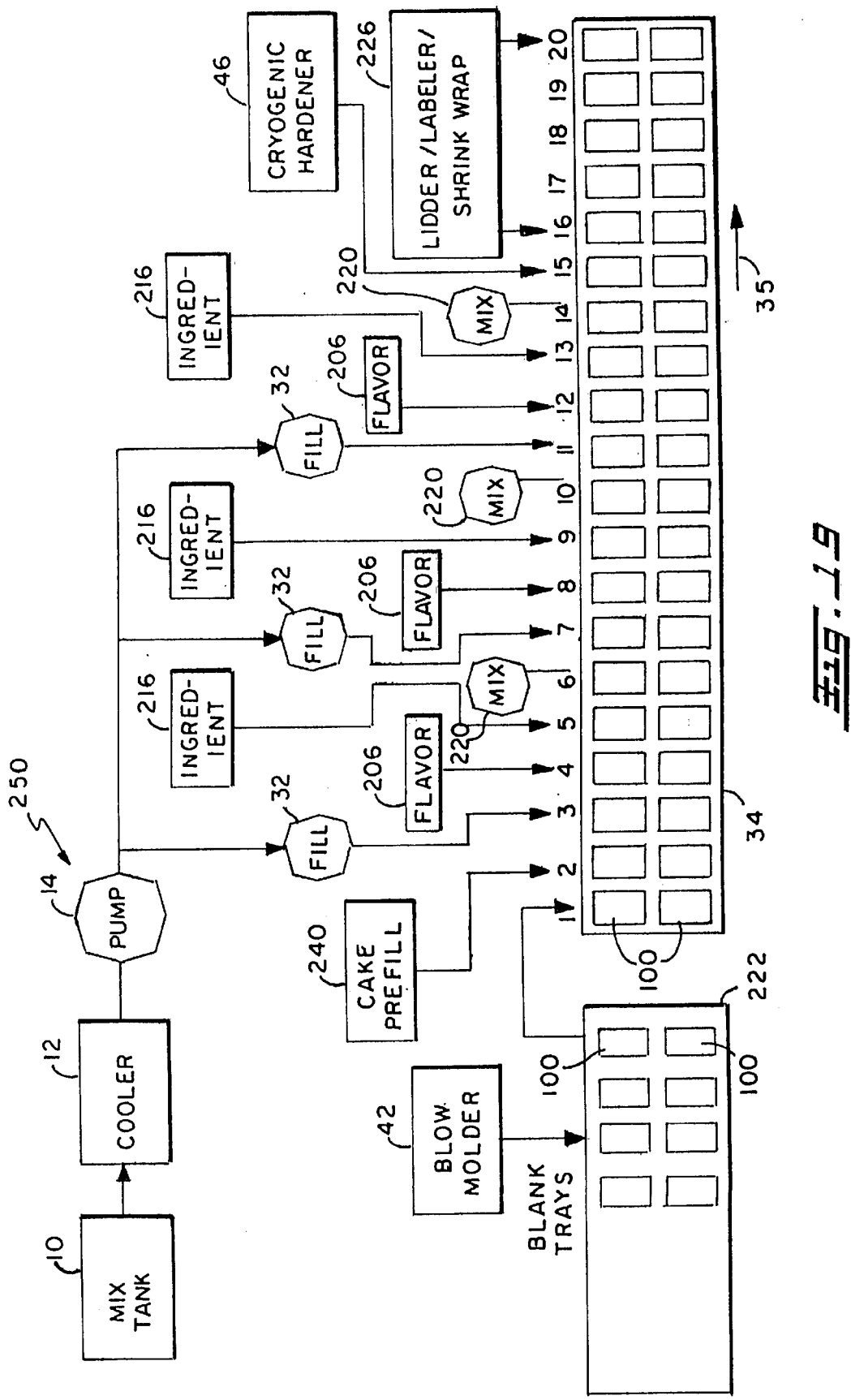

ICE CREAM MANUFACTURING AND PACKAGING PROCESS AND A PACKAGE FOR THIS PROCESS

This application is a continuation-in-part of application Ser. No. 09/118,246, filed on Jul. 17, 1998 Now U.S. Pat. No. 6,103,287.

FIELD OF THE INVENTION

This application relates to a process for manufacturing and packaging ice cream and to an improved ice cream package for use in this process.

BACKGROUND OF THE INVENTION

Ice cream is a product enjoyed by many consumers. It is purchased by consumers in the ready to eat form as ice cream cones and ice cream sundaes at restaurants and specialty stores. It is also purchased by consumers in multiple serving containers. These multiple serving containers come in several sizes and shapes. Two common multiple serving containers are half gallon boxes (sometimes referred to as "bricks") and half gallon round tubs (sometimes referred to as "rounds"). Bricks and tubs or rounds are made from paper, cardboard, plastic, and composites of these materials, such as plastic coated paper. This invention is specifically directed to multiple serving containers for ice cream to be sold to consumers and it will be described with reference primarily to the half gallon size although it is applicable to other multiple serving consumer packages such as pint, quart, five quart, and three gallon size. Standard half gallon bricks are five inches by seven inches by three and one-half inches deep.

Ice cream containers perform several functions. Some of these functions are performed at different times in the life of the container and described below sequentially with reference to the ice cream manufacturing and distribution process.

Conventionally, ice cream is manufactured by mixing liquid ingredients in a mixing tank and feeding the mixed ingredients into a cooling unit where the mixed ingredients are reduced in temperature to about 20° F. The mixed ingredients become significantly more viscous but will still flow. If the flavor being manufactured includes solid items, these solid items, such as cookie parts, are mixed into the flowing material at this point. This chilled and fully mixed material is fed to a package filling machine which feeds the material into the ice cream package. The ice cream package is closed and shrink wrapped to other packages for more convenient handling. The packaged ice cream is then placed in a hardening area for several hours where its temperature is reduced to zero or below for hardening. The packaged, finished ice cream is ready to be stored or shipped. The packages perform several functions in this process.

The package carries information about the product it contains. The ice cream package is preprinted. It contains product ingredient information, the flavor, the size, the brand name and graphics intended to persuade purchasers to buy this particular container of ice cream. Packaging is specific to each flavor of ice cream. Packaging is also specific to different customers. Thus, a particular supermarket chain will have a requirement for one package bearing its store brand name while a different market chain will offer a similar or identical product in a different package. Packages generally take about ten to twelve weeks to create, order and print. Thus, producing product for each chain requires careful planning and much lead time.

The package also performs the function of receiving the ice cream as it is measured and divided into a consumer product. The package acts as a receptacle in the metering process.

The package acts as a container for the ice cream in processing, that is, in hardening of the ice cream into a finished ice cream product. The package has an impact on the hardening process.

The inventory of finished ice cream products is kept at low temperature, around −10° F. to −20° F. The finished inventory is usually very large as a finished inventory of each flavor desired by each customer in each package type required by the customer is often kept on hand. Keeping up such a large inventory is expensive. While conventional wisdom requires a large inventory to meet customer needs, it does not improve the product. Ice cream does not improve with age.

When a retailer requires delivery, the flavors required in the packages required are selected from finished inventory, assembled on pallets and shipped. The packaged ice cream is received at supermarkets and the like where it is placed in freezer display cases. The freezer display cases are conventional and are either upright type cases or open chest type freezers. Upright cases in which the packages are displayed on shelves in the freezer extending from just above the floor to above eye height are popular. Alternatively, the ice cream is kept in open chest type freezers in which the ice cream is stacked within a freezer compartment from just above floor level to about waist level. In the freezer, the ice cream package performs the function of displaying required product information including size, flavor, brand name, and the like. The package also carries a graphical display, such as a picture of the product, designed to please the consumer. The shape, size and overall appearance of the package has an impact on the consumer and helps the consumer to reach a conclusion on the perceived desirability of the product and whether to purchase it or not. Thus, the package performs an important marketing function. Typically, a retailer can achieve a "pack out" (a freezer loading) of about 120 units with round tub packages. A retailer can obtain a pack out of about 240 units with brick packages.

After purchase, the ice cream is transported by the consumer to the home and stored in the freezer compartment of a refrigerator. The package often resides in the consumer's freezer compartment for at least several days as a half gallon of ice cream contains several servings. Each serving of ice cream is removed from the container and the container is placed back in the freezer to store the remaining portions for later consumption.

The above described process starts with liquid ingredients or raw materials, solid raw materials and packages. Most of the liquid raw materials are common to all flavors and brands of ice cream which an ice cream manufacturer is selling. Therefore, the liquid ingredients inventory can be reasonably managed. The packages, however, are a different question. Packaging is expensive. Half gallon cardboard packaging printed and delivered to the ice cream plant costs about 12¢ to 15¢ per unit when purchased in the millions. Round packages cost 28¢ to 30¢ per unit when purchased in the millions. The manufacturer must have packaging for each brand and flavor his or her other customers' desire. He or she must purchase packages in large quantities to obtain the best price. If a particular retailer carries three quality levels of ice cream, each with ten brands, 30 different packages for each size desired are required. The cost of holding inventory of so many different packages is high.

If a manufacturer is making a particular flavor on a day, it may wish to use ice cream packages for multiple customers demanding their own packages. This requires changeovers resulting in wasted product and/or wasted time while the package feeds to the packaging line are changed.

Conventional packaging lines are package specific. Thus one packaging line will fill half gallon cardboard containers only. A separate packaging line has to be set up if the manufacturer is also producing ice cream for packaging in half gallon plastic tubs. Plastic tubs must also be kept on hand in large quantities for each brand and flavor produced. This is because, like the cardboard bricks, the tubs have product information, trademarks and the like printed directly on the tubs. The tubs are also expensive, about 28¢ to 30¢ cents per unit for printed tubs delivered to the ice cream factory in large quantity.

Hardening of the ice cream in the conventional process takes several hours and is capital intensive. One method of hardening the packaged ice cream is called a roller bed process. The ice cream packages are placed on a roller type conveyor in a very cold room where cold air is circulated by blowers. The ice cream containers are held in this very cold room for 10–12 hours where hardening occurs. Another hardening system is available from Freestech International, Ltd., P.O. Box 1657, Lancaster, Pa. and is known as the Tri-Tray system. It provides moving trays upon which the ice cream is disposed. The trays move within the cold room and cold air is blown around the ice cream while it moves on these trays. This movement results in decreased hardening time, but several hours are still required to harden the ice cream to appropriate finished temperatures. In both of the above described hardening methods, hardening is accomplished by heat exchange through cold moving air interacting with the package. Another method of hardening ice cream is with a contact plate hardener. In a contact plate hardener, coolant is passed through aluminum plates reducing their temperature to a very low level. Packages of ice cream are fed into the contact plate freezer. Plates contact the lower and upper surfaces of the packages while heat is extracted from the ice cream into the chilled aluminum plate. Plate freezers are efficient when used with packages having flat tops and bottoms and which can be packed adjacent one another with side walls in direct contact. Contact plate freezers therefore are usable with brick packages but are not well suited to tubs. With one half gallon cardboard bricks of the normal three and one-half inch height, the contact plate freezer typically requires about 1½ to 2 hours of residence time for hardening ice cream.

The above described hardening processes require large capital expenditures. Typically, an ice cream manufacturing plant will spend several million dollars on a Tri-Tray hardening line. Contact plate freezers cost about a million and a half dollars and are limited to a single thickness. Thus, several hardeners will typically be required.

Because retail stores demand such variety of flavors and packages for those flavors, a large inventory must be kept on hand and kept at the hardened temperature, about −20° F. One ice cream producer has built a high rise automated cold storage facility 62 feet high and 250 feet long to store inventory of over 400 different ice cream packaged products (see March 1989 issue of *Dairy Field*). Capital costs and operating costs for such automated material handling and cold storage facilities are large.

Packaging also has an impact on how ice cream is sold at the retail store. At the retail store, the packages are stored and displayed in freezers. One of the most popular and useful freezers is a vertical freezer in which ice cream is displayed on shelves starting near the floor and rising to above eye level. This provides a visual display in which a large number of packages can be seen by the consumer and easily removed from the freezer for purchase. Typically, because of shelf spacing and access needs, half gallon bricks are displayed with two half gallon packages stacked one on top of another on a shelf. The shelf must be spaced vertically sufficiently for the consumer to reach in and select a package even after the first few rows have been taken. Shelves cannot extend too low or too high or consumers will not reach them. These limitations result in a typical display being four containers wide and five shelves high for a total of twenty visible slots each slot containing two half gallon bricks one stacked on top of the other. Each of the 20 slots is filled with several pairs, one behind the other. A maximum of 20 flavors is therefore displayable. This also limits the area of a package visible to a consumer. If the consumer can only see a single side of the package as it is displayed in the freezer compartment, the remaining sides of the package are lost as marketing tools. Thus, the size of one side is the size of the primary marketing surface.

Packaging also has an impact on consumer enjoyment of ice cream. In the home, conventional brick type ice cream packages are normally stored in the freezer compartment of a refrigerator. The brick opens from the top or side and most consumers will store this package in only one orientation, with the top on top. This takes up a significant amount of volume in the freezer. Moreover, once the package is opened there will be voids within the package and it becomes difficult to stack other items on top of the ice cream package. Space is wasted within the consumer's refrigerator freezer compartment. Most consumers have only limited freezer compartment space and a great demand for this space.

An additional problem with the half gallon brick ice cream container is that it is relatively unfriendly to consumers when serving ice cream. This is particularly evident when one is trying to scoop out the last serving of an ice cream container. The corners of the brick are 90° angles and very difficult to properly empty. The container is relatively tall. This often results in one getting ice cream on one's sleeve when one is removing ice cream from the container. The container also flops around when one is trying to get ice cream out of it aggravating the problem. When the container is empty, it is trash and must be disposed of. Putting it straight in the garbage is often messy as there is a residue of ice cream in the package which may leak in an unintended manner. Rinsing out the ice cream container is also difficult as it is flexible, difficult to handle and contains overlapping surfaces which often hold unsuspected liquid.

Some ice cream is sold in half gallon paper or plastic tubs. These tubs have a somewhat flat bottom, a gently tapering conical side wall and a somewhat flat top closed by a flanged rib. These tops can be securely closed after being opened by a consumer. However, the tub shape is very inefficient in the freezer. Tubs stacked adjacent to one another have significant volumes of air between adjacent tubs. This is true in the consumer's freezer, the retailer's freezer and the manufacturer's hardening process. Significantly more space is required for an inventory of tubs when compared to an inventory of similar count in bricks. The pack out for a given freezer using tubs is significantly less than the pack out achievable for bricks. Tubs are not efficiently processed in a contact plate freezer. Tubs are expensive and expensive to print upon.

Retailers now demand a variety of ice cream products including a variety of flavors and a variety of labels for each flavor. Thus, retailers will offer branded products and private label products in the same package size and same flavors but with different packaging. Different retailers require different packages. The lead time for appropriation of a package is long. For instance, 10 to 12 weeks is the normal lead time from finished layout to receipt of a supply of printed boxes for brick type half gallon containers. Because of this long lead time and the wide variety of packages required, ice cream manufacturers must keep a large inventory of finished packages on hand. This is expensive as it ties up capital. It is also wasteful as packaging requirements change and old inventory must be scrapped. Because the lead time is long, retailers cannot take advantage of changing consumer tastes or special events. A retailer must wait at least 10 to 12 weeks if he or she decides that a new flavor or package graphics is desired by consumers. Even a minor change in a package requires preparation of new printing plates at a cost of about $1,000 to $2,000.

Manufacturers have been maintaining large inventories of finished products in cold storage warehouses. This is because of the wide variety of flavors and packages required by retailers in a single shipment and the long processing time required in the conventional ice cream manufacturing process. Including hardening, processing from liquid ingredients to finished hardened product takes from about 1½ to about 12 hours. As described above, ice cream manufacturers have been addressing this problem of a large and varied inventory by building large, automated finished product warehouses.

Retailers have also been limited by current ice cream manufacturing techniques. The display of the ice cream packages in vertical freezer cases is awkward. One displays only one side of the half gallon brick. The largest panel, the top, measures five inches by seven inches. This limits the merchandising display available on the product. Moreover, sometimes bricks are stacked with the top on top and the top of the brick is not visible to the consumer. The retailer's problems are not addressed by the round tub. While round tubs are sometimes associated with premium brands of ice cream, the display properties are not good. If the tubs are stood upright in vertical freezers, the surface presented to the consumers is curved. This greatly reduces its usability. Moreover, proper orientation of the tubs in the freezer is not always achieved. The display panel desired may be facing the back of the freezer rather than the front. The top of the tub is not visible in vertical display cases and, if the tub is displayed on its side to make the top visible, the tub is likely to roll around in a chest type freezer, only the top of the tub is visible. The tub is also very inefficient in volume utilization. Tubs, when stored next to one another, always include significant amounts of air space between adjacent tubs.

Thus, the retailer is provided with packages which do not present good merchandising panels when stored in a vertical freezer and which do not facilitate maximum use the volume of a freezer. As freezer space is very expensive at retail, this is a considerable loss.

The consumer too is limited by current ice cream manufacturing and packaging techniques. Paper or cardboard half gallon bricks are difficult to use and store and often result in the soiling of one's clothing when dispensing ice cream. The cartons are difficult to dispose of neatly and are difficult to store in the freezer. Half gallon tubs are even more difficult to store in the freezer, are deep and therefor just as likely to soil clothing. Plastic tubs also add expense to the ice cream product which, ultimately, the consumer pays. These packages, even the plastic tubs, do not reseal well and are not optimal for reuse by the consumer.

In addition to the above difficulties caused by the use of pre-printed ice cream containers and lengthy hardening methods, manufacturers have heretofore struggled with the economic burdens of maintaining extensive and costly pre-precessing equipment and inventory associated with the pre-hardening manufacturing process. Previously, liquid raw materials were added to a mixing tank, then mixed and subsequently cooled. Flavoring was typically added prior to mixing. The cooled materials were then pumped to a filler for insertion into a pre-printed container. Optional solid ingredients could be added to the mixture before the filler, such as nuts, cookies, etc. In this type of process or system, a single assembly line was dedicated to producing batches of a single flavor of ice cream. Apart from the aforementioned problems arising from the use of pre-printed ice cream containers, changeover of the prior systems from one flavor to another was difficult and expensive due to the pre-hardening process configuration itself. Where the ice cream flavoring was added to the mixing tank before cooling, a changeover from chocolate to strawberry required that the entire system from the mixing tank to the filler be first emptied of chocolate. To reduce wasted ice cream and reduce down time between batches of different flavors, larger batches of a given flavor have been preferred. In the situation where changeover of the pre-hardening ice cream manufacturing process was longer than changing the supply of pre-printed containers, all the required chocolate would be preferably manufactured at once with intervening downtime only for container changes, and/or to optionally activate or deactivate the addition of solid ingredients. Larger batch sizes, however, require more sophisticated production scheduling in order to ensure that all current orders for a given flavor are run sequentially. In addition, where such large volume batches are employed, the lead time from customer order placement to shipment will generally increase. Where a single customer places an order for multiple flavors, as is typical of retail grocers, the required chocolate may be ready for shipment far in advance of the other ordered flavors. The total time to fill the entire order may thus be substantially longer than would otherwise be the case, were smaller batch sizes used, or were partial shipments used. Most customers do not like partial shipments because of increased accounting and other overhead expenses. Moreover, some customers will not accept partial deliveries, in which case the manufacturer must store the partial orders awaiting completion of the last flavor or type required to fill a given order. From a customer point of view, therefore, the use of large batch sizes by the ice cream manufacturer results in an aggregate increase in delivery time, or an increase in the number of partial shipments, or both, without any improvement in the quality of the ice cream.

The manufacturer has heretofore been forced to minimize changeover and setup time at the expense of longer delivery times and increased short term storage capacity, or vice versa. No optimal balance is truly achievable in this situation absent a manufacturing process or system which reduces the time required to change from production of one flavor or variation of ice cream product to another according to customer order information. The same problem of reducing production changeover time applies not only to ice cream flavors, but also to ingredients added to the ice cream, such as chocolate, candy, nuts, cookies, marshmallow, fruit, spices, brownies, pastry, and the like.

Also burdensome from a manufacturing/production control perspective is the use of multiple layer pre-filled food, such as cake or crumble, or graham crackers, which are commonly added to a bottom layer of an ice cream container prior to filling with ice cream. Indeed, such dessert treats are fast becoming popular for special occasions such as birthdays, etc. Desserts in this variety include multiple pre-fill layers, for example, with cake on the bottom, a caramel layer above the cake, chocolate in another layer, and including ice cream with nuts on a top layer. Such layers can include many foods such as caramel, fudge, peanut butter, chocolate, fruit products, cookie dough, sherbet, spices, marshmallow, and the like. As with simply changing the flavor of ice cream in an assembly line or manufacturing system, changing or varying pre-filled layers of such non-ice cream foods can create further changeover delays and downtime which can potentially be greater than those relating to changeover of pre-printed packages or containers. A system and process are therefore desirable which reduce or eliminate downtime in an ice cream manufacturing facility related to different flavors, solid ingredients, number and composition of different layers of food and/or ice cream, and printing or labeling appearing on the product container and/or lid.

Prior ice cream manufacturing and packaging processes and systems also require oversight and management of production, scheduling, planning, and control. As mentioned above, production batches or runs may be scheduled based solely on customer order information received in customer purchase orders. In this case, an order for a certain flavor, mixture, etc. of ice cream product may be received just after a batch of that particular product has been completed for shipment elsewhere. As a result, the order will suffer extended completion time because the economics of large batch processing dictate that another batch of the same product will not occur again for some time. The random nature of the composition and timing of customer order information in prior systems results in reduced ability of the manufacturer to consistently and accurately provide delivery date promises. Variance or inaccuracy in delivery schedules forces the customer to order further in advance, while providing additional storage space and refrigerated inventory facilities for any orders received early, just to ensure minimum on-hand quantities of certain products on a daily basis. Trending, stochastics, fuzzy logic, neural networks, and other mathematical or statistical modeling or predicting techniques have been employed by manufacturers in setting production schedules, and also by customers in placing purchase orders. Typically, a manufacturer will use some sort of modeling of customer buying trends, possibly including seasonal adjustments, to supplement the raw order data in deciding batch scheduling. Under-production tends to decrease batch sizes with the resulting increase in downtime and changeover delays, whereas over-production tends to increase inventory carrying costs. Furthermore, if inventory is kept on-hand at the manufacturer in order to reduce the time from order to shipment, the average age of the product increases, as does the cost due to the inventory overhead. The product age is important in the ice cream business where shelf-life information is considered by the ultimate consumer. Moreover, inventory maintenance problems have been multiplied and exacerbated in recent years by the increased number of ice cream flavors and other product variations desired by consumers. This will be worsened further as the variations in solid ingredients and pre-filled food layers increase. In order to reduce inventory costs, changeover costs, and batch change downtime, and ensure prompt delivery, it is desirable to provide a process and system for manufacturing ice cream products according to customer order information which provides production controls with information from customer databases, cash registers, and/or mathematical requirements predicting models for use in production planning.

SUMMARY OF THE INVENTION

In accordance with the present invention, a process of manufacturing and packaging ice cream is provided in which a low aspect ratio, one piece plastic tray is filled with ice cream, the ice cream in this tray is then quickly hardened in a cryogenic hardener and a lid and label is applied to the finished product.

Further in accordance with the invention, a container for multiple serving retail portions of ice cream is provided comprising a generally rectangular plastic tray having a generally flat bottom, four side walls and an open top, one of the four side walls being a foot side wall having a generally planar foot outer surface generally perpendicular to the bottom and a surface adapted to accommodate a lid. A generally rectangular lid having a flange extending perpendicular to the periphery of a lid is also provided. The flange of the lid extending over the foot side of the tray has an outer surface generally coplanar with the foot outer surface whereby the tray and lid in a filled assembled condition can be stood on the foot and remain stable.

Still further in accordance with the invention, the container is provided with a shallow recess in the lid sized to accommodate a label and to accommodate the bottom of another identical container so that multiple containers can be stably stacked.

Yet further in accordance with the present invention, the tray of the container is generally rectangular with side walls diverging from the vertical by only about 1°–2°.

Still further in accordance with the invention, the tray of the container is provided with rounded corners at all locations at which two walls intersect.

Yet further in accordance with the invention, the tray and lid of the container are blow molded from plastic material.

Still further in accordance with the invention, the tray is provided with a rib extending around the outer periphery of the tray near the open top and the flange of the lid engages this rib and is held in place in the closed position by this rib. The flange on the lid may also be provided with a rib to aid sealing of the container.

Still further in accordance with the present invention, there is provided an improved process and system for manufacturing and packaging ice cream for shipment in a shipping container according to customer order information by which the above mentioned problems are minimized or overcome.

In accordance with one aspect of the invention, there is provided a process of the type described above in which ice cream and one of a plurality of different flavorings are added separately to a shipping container or tray, and subsequently mixed or blended in the shipping container or tray according to customer order information.

In accordance with another aspect of the invention, there is provided a process and system of the type described above in which one or more layers of solid, semi-solid, or liquid food ingredients are added to the shipping container, a top layer of ice cream and flavoring are subsequently added to the container, and the ice cream and flavoring are mixed or blended together in the top layer of the container.

In accordance with another aspect of the invention, there is provided a process and system of the type described above in which solid food ingredients are added to the shipping container in the same layer as the ice cream and flavoring.

In accordance with another aspect of the invention, there is provided a process and system of the type described above in which the ice cream is hardened in a cryogenic hardener subsequent to being mixed and lids and labels or printing are added to the shipping container following hardening.

In accordance with another aspect of the invention, there is provided a process and system of the type described above in which the customer order information is provided to the manufacturing system directly from a customer sales database or from customer cash registers, either through periodic polling by the manufacturing system, periodic downloads by the customer to the manufacturing system, or asynchronously as sales of ice cream products occur by the customer to end product customers.

It is a principal object of the invention to provide a process for manufacturing and packaging ice cream which reduces a manufacturer's overall cost, increases manufacturing flexibility, reduces lead time on packaging changes, reduces the amount of finished goods inventory required to be held by a manufacturer and otherwise improves the manufacturing process.

It is another object of the present invention to provide a package which is easier to process, quicker to harden and can be labeled after filling.

It is still another object of the present invention to provide a package which can be displayed at retail in either the horizontal or vertical orientation and will present a large attractive principal display panel in either vertical or chest type freezers.

It is yet another object of the present invention to provide an ice cream container having all product information and graphics on one large display panel whereby display area is not wasted.

It is still another object of the present invention to provide an ice cream container which is generally rectangular in shape to maximize utilization of freezer space for the manufacturer, the retailer and the consumer.

Still another object of the present invention to provide an ice cream container which is reusable as a storage container by the consumer.

Another object of the present invention is the provision of a process and system for manufacturing and packaging ice cream products which allows quick changeover from one flavor of ice cream to another with little or no downtime or product waste.

Yet another object of the present invention is the provision of a process and system for manufacturing and packaging ice cream products which allows quick changeover from one type of solid ingredient such as cookies, crackers, nuts, or candy to another such ingredient, or from adding such ingredients to adding no ingredients, with little or no downtime or product waste.

Still another object of the present invention is the provision of a process and system for manufacturing and packaging ice cream products which allows selective addition or exclusion of one or more layers of solid, semi-solid, or liquid food layers prior to or after the addition of ice cream to a shipping container with little or no downtime or product waste.

A further object of the present invention is the provision of a process and system for manufacturing and packaging ice cream products which produces a continuous pre-hardening process capable of selectively producing a wide variety of flavor, ingredient, and/or pre-fill layer variations of ice cream products in accordance with customer order information with little or no downtime or product waste.

Another object of the present invention is the provision of a process and system for manufacturing and packaging ice cream products which reduces inventory costs for both the manufacturer and the customer.

Yet another object of the present invention is the provision of a process and system for manufacturing and packaging ice cream products which reduces purchasing and accounting costs for both the manufacturer and the customer.

Still another object of the present invention is the provision of a process and system for manufacturing and packaging ice cream products which reduces the average product age of products shipped to the customer.

A further object of the present invention is the provision of a process and system for manufacturing and packaging ice cream products which minimizes the time delay between order and shipment.

Yet another object of the present invention is the provision of a process and system for manufacturing and packaging ice cream products which provides for just-in-time delivery of ice cream products to a customer.

Still another object of the present invention is the provision of a process and system for manufacturing and packaging ice cream products which reduces manufacturing production control and scheduling costs.

Another object of the present invention is the provision of a process and system for manufacturing and packaging ice cream products which reduces the raw material inventory per unit product.

BRIEF DESCRIPTION OF THE DRAWINGS

The foregoing objects, and others, will in part be obvious and in part pointed out more fully hereinafter in conjunction with the written description of the preferred embodiments of the invention illustrated in the accompanying drawings in which:

FIG. 3 is a perspective view of the tray and lid forming a container for use in the process of FIG. 1;

FIG. 4 is a top view of the tray seen in FIG. 3;

FIG. 5 is a side view of the tray seen in FIGS. 3 and 4;

FIG. 6 is a foot side view of the tray seen in FIGS. 3–5;

FIG. 7 is a top view of the top of the lid seen in FIG. 3;

FIG. 8 is a side view of the lid seen in FIGS. 3 and 7;

FIG. 10 is a cross section of two of the containers seen in FIGS. 3–9 in the assembled condition and stacked one on the other;

FIG. 11 is a view similar to FIG. 10 but showing the two containers standing on their foot sides;

FIG. 12 is a view similar to FIG. 6 showing the foot side of an assembled tray and lid forming a closed container;

FIG. 13 is a view of the top of a container in accordance with the present invention displayed standing on its foot as a consumer would see the container in a supermarket vertical freezer;

FIG. 14 is a schematic diagram showing an alternate implementation of the process as shown in FIG. 1;

FIG. 15 is a schematic diagram showing a variation in the process as shown in FIGS. 1 and 14;

FIG. 16 is a schematic diagram showing another variation in the process as shown in FIGS. 1, 14, and 15;

FIGS. 17 and 17A are schematic diagrams showing yet another variation in the process as shown in FIGS. 1 and 14–16;

FIG. 18 is a schematic diagram showing still another variation in the process as shown in FIGS. 1 and 14–17;

FIG. 19 is a schematic diagram showing another variation in the process as shown in FIGS. 1 and 14–18;

DESCRIPTION OF PREFERRED EMBODIMENTS

Figure 1:
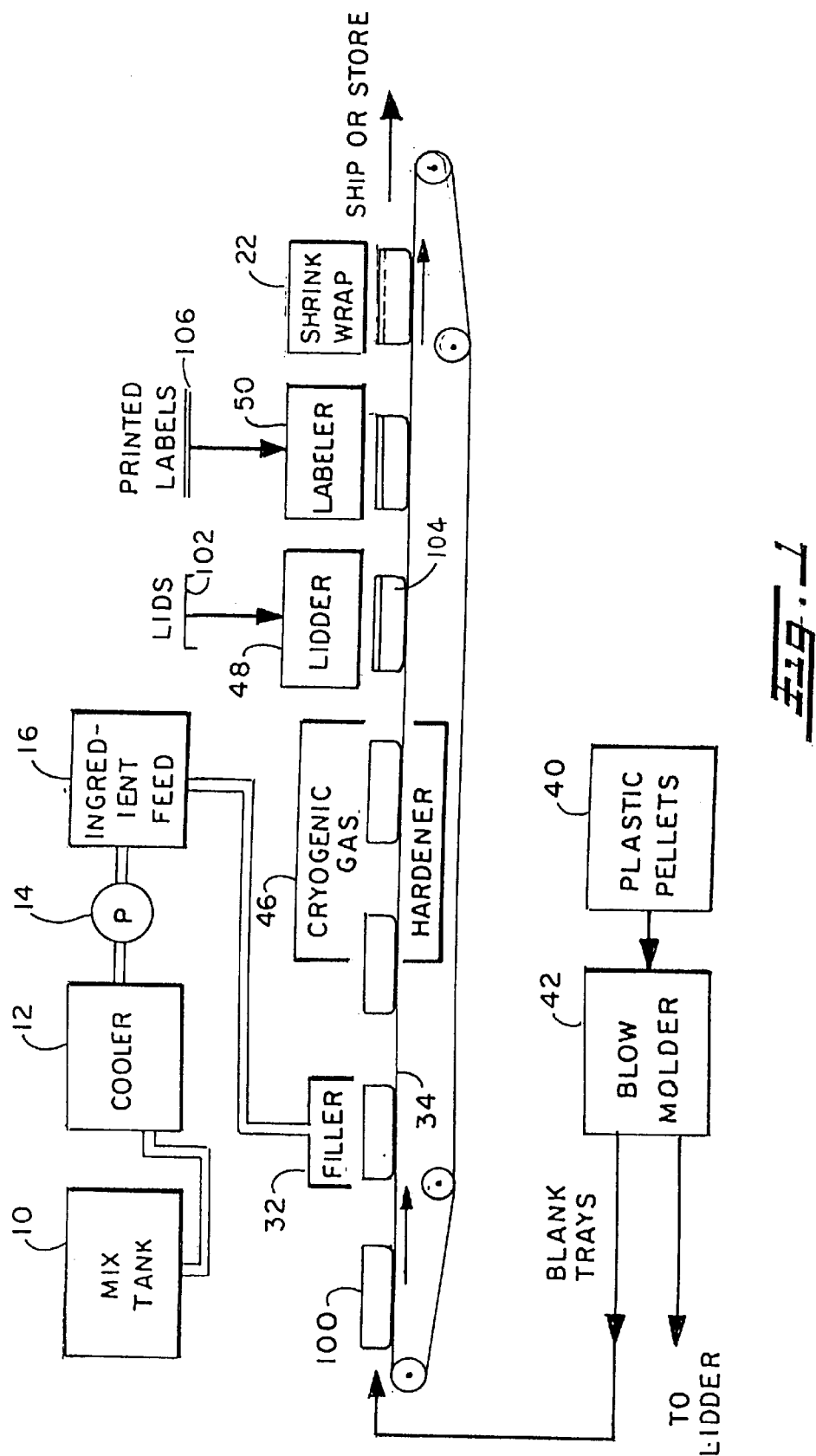
FIG. 1 is a schematic diagram of the manufacturing and packaging process for ice cream in accordance with the present invention.
Figure 2:
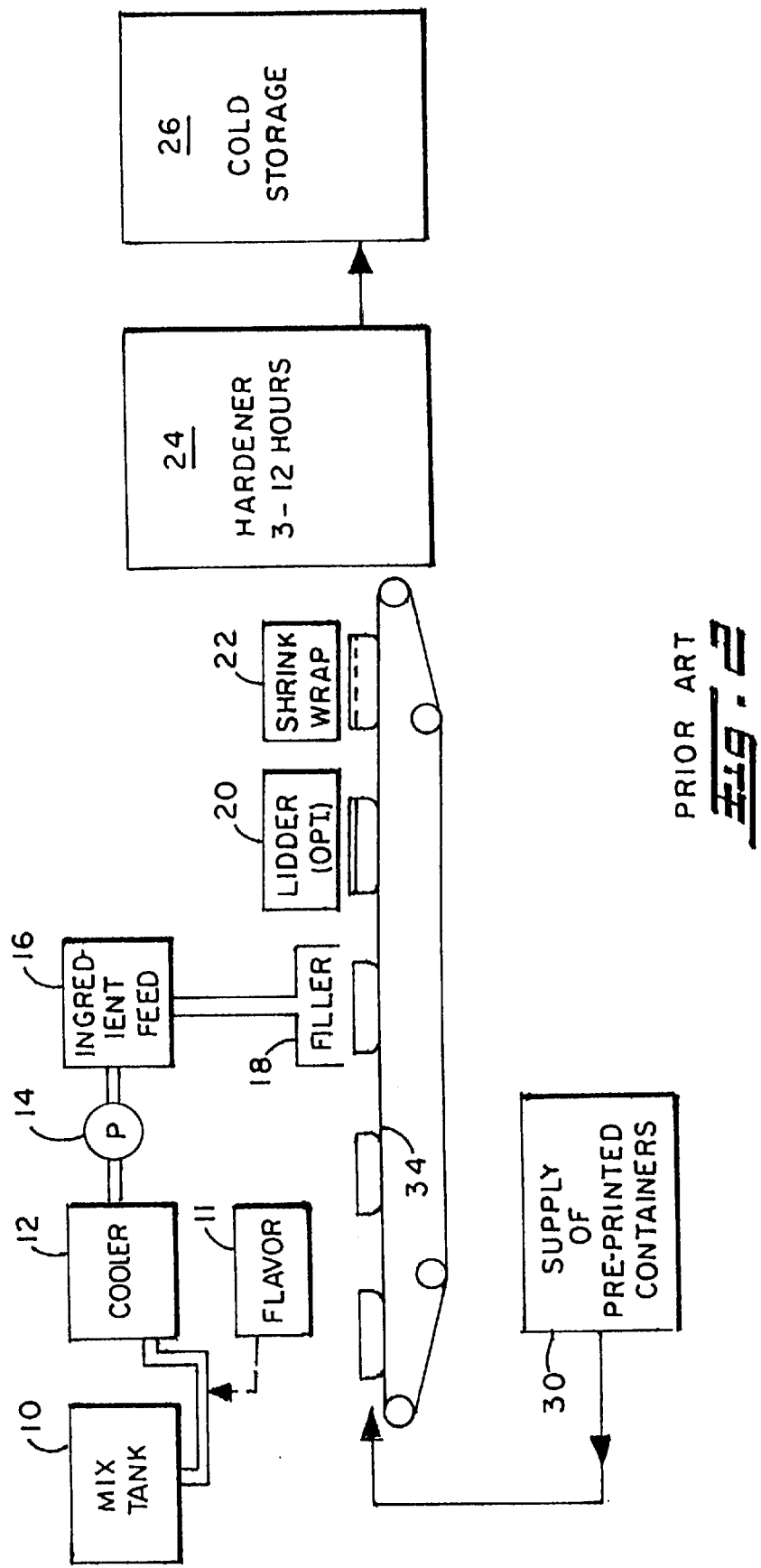
FIG. 2 is a schematic diagram of the manufacturing and packaging process for ice cream as performed in the prior art.

Referring now in greater detail to the drawings wherein the showings are for the purpose of illustrating preferred embodiments of the invention and not for the purpose of limiting the invention. FIG. 1 illustrates a preferred process of manufacturing and packaging multiple serving ice cream products in accordance with the present invention. A prior art system is shown in FIG. 2. The prior art system will be described first.

Commercial making of ice cream starts with conventionally, liquid ingredients, including dairy products, placed in a mix tank 10 and blended. The blended liquids are conveyed to a cooler 12 where mixing continues and the mixed ingredients are chilled to about the freezing point of water. Often a temperature of 20° F. (7° C.) is the target temperature to which the mixed ingredients are chilled. The chilled mixed ingredients become more viscous and take on the consistency of soft ice cream. This material is conveyed by a pump 14 through an ingredient feed 16 to a package filler 18. Pump 14 is sometimes integral with the cooler 12. Flavor 11 is added to the liquids prior to cooler 12. The ingredient feed 16 is used to add solid ingredients such as cookie pieces to flavors such as Cookies and Cream. The package filler 18 takes the soft ice cream material and fills it into consumer containers for the product. Package fillers are commercially available, as are all of the above described elements. Package fillers are usually specific to a particular package. Thus, if one is filling half gallon cardboard brick containers, one will use a package filler specifically designed to completely fill and close the one half gallon brick container. Alternatively, if one is filling one half gallon or one quart round tubs one will use a package filler design for this package. The ice cream being filled at the package filler 18 is not an easily flowing liquid and the function of the package filler includes filling the entire package completely and not leaving air voids in the corners and the like. When a change in ice cream flavor is needed, the entire system from tank 10 through filler 18 must be purged. Likewise, when a change in the type of solid ingredients is desired, the system from ingredient feeder 16 through filler 18 has to be purged. Moreover, such changeovers in ice cream flavor and/or solid ingredients require a corresponding change in the supply of pre-printed containers 30. Purging of the prior systems causes significant downtime, as does changeover in the pre-printed container supply. In addition, purging of the system often results in product waste. In order to minimize the downtime and product waste caused by changeovers in ice cream flavor and/or ingredients, manufacturers tend to schedule large production runs or batches of the same variation. Alternatively, multiple separate production systems such as that shown in FIG. 2 may be employed, each dedicated to one or a limited number of flavors or ingredients. Separate dedicated systems are expensive and consume a great deal of factory floor space and energy. Larger batch sizes result in increased inventory storage and delay shipments to customers ordering more than one flavor or variant of ice cream product.

As can be seen schematically in FIG. 2, two elements come together at the package filler 18. These elements are: the soft ice cream product and the package. In the case of half gallon bricks, the packages are provided to the filler 18 in a flat form. The filler 18 opens the packages, fills them and closes them. In the case of tubs, the plastic tubs are already three dimensional items and are conveyed to the filler in a way which facilitates filling at the filler 18. The illustration in FIG. 2 showing the empty containers on the representation of the conveyor belt 34 is simply a schematic means of illustrating the provision of packaging to the filler 18. Commercially available fillers include various packaging feed mechanisms and magazines.

In the case of a round tub of ice cream, after the tub is filled a lid must be placed upon it. This function is performed at the lidder station 20. The lidder 20 may be an integral part of the filler 18. After the lid operation has occurred, a number of closed packages are assembled and a shrink wrap applied at shrink wrap station 22. Shrink wrapping is done to ease handling and improve efficiency. Shrink wrapped products are then conveyed to a hardener 24 where they will reside for about 2½ to 12 hours while the ice cream contained in the container is chilled and hardened. Hardeners are commercially available equipment. One type of hardener is often referred to as a roller bed hardener. It consists of a large room having roller conveyors in which the packaged ice cream is placed. Chilled air circulates within the room which chills the ice cream product down to a low temperature, typically 0° F. (–18° C.) or less. The cooling normally takes about 12 hours for a facility producing large amounts of ice cream. Clearly, a very large cold room is required. A second type of hardener is called a Tri-Tray. In a Tri-Tray, both air and product are moved about within a large chilled enclosure. Cooling of the product to the desired temperature is accelerated. However, several hours are still required. A third type of hardener is known as a contact plate freezer. Contact plate freezers work quickly with cubicle products such as half gallon cardboard ice cream containers. The containers are packed closely together and very cold aluminum plates are placed on the top and bottom of the containers chilling them by direct contact with the cold metal. Basically they accelerate the cooling process. However, a 1½ to 2 hour cooling period to reach appropriate hardening temperature is still normally required.

The hardeners described above are large and expensive to install and work best with very large production runs.

Following hardening at the hardener 24, finished product is conveyed to a cold storage area 26. Because consumers desire many different flavors of ice cream and retailers desire many different brands of ice cream, ice cream manufacturers need to keep a large variety of products on hand in order to satisfy their retailer customers. This has resulted in the construction of very large, very expensive automated cold storage warehouses for ice cream manufacturers. Capital costs for such cold storage facilities 26 are great.

In addition to the liquid raw materials which an ice cream manufacturer must have on hand to manufacture ice cream, the manufacturer must have on hand a supply of preprinted containers 30. These containers are expensive and a supply for each flavor and each brand required by various retail chains must be maintained by the ice cream manufacturer. Thus, the ice cream manufacturer must keep a supply of half gallon cardboard boxes for each flavor and each store brand for each of the stores to which he or she sells ice cream. Moreover, such boxes must be kept for the ice cream manufacturer's own brand in each flavor. Additionally, often premium brands are sold in plastic tubs. These plastic tubs are preprinted and a supply of plastic tubs in each brand and flavor must also be maintained. Consumers also wish to buy ice cream in various size containers. A consumer may wish to buy a special flavor in a premium brand for a special occasion and would select a quart size. On the other hand, a consumer purchasing ice cream for a family get together may purchase several half gallons or a five quart container of ice cream in a selected flavor and brand. The manufacturer must have a supply of each package in each flavor, size and brand. Should the manufacturer decide to change the package to better reflect consumer preferences in graphics, change an ingredient listing, identify a new distributor, or otherwise comply with consumer, retailer or government demands, normally a 10 to 12 week or greater lead time is required. The packages must be designed, printed and package inventory shipped. As most packages include color high quality graphics, the process is not easy on multiple sided cardboard containers or upon the curved plastic tubs.

Additionally, the ice cream manufacturer must have a filler supported by the remaining equipment described above for each different size and style of container used. A filler and production line used for a half gallon brick is not usable for a half gallon or quart round tub. Thus, multiple production lines are required. While these multiple production lines can end in a single hardener 24 and single cold storage facility 26, significant capital investment is required. Additionally, multiple production lines feeding a single hardener 24 and a single cold storage facility 26 results in the need for a large capacity hardener 24 and a large capacity cold storage unit 26. This multiplies capital costs.

Referring again to FIG. 1 illustrating one embodiment of the invention, one sees a mix tank 10, a cooler 12, a pump 14, and an ingredient feed 16 just as in the conventional system. These elements are conventional and commercially available. The soft ice cream with solid ingredient exiting the ingredient feed station 16 is directed to a filler 32. The filler 32 is slightly modified from existing fillers to fill a unique ice cream tray 100. The tray 100 is plastic. A plastic supply provides plastic to a blow molder 42 which creates blank trays 100 and blank lids 102. The plastic supply 40 is in the form of plastic pellets. Blow molders are a commercially available product which can produce blank trays and blank lids very quickly and inexpensively. Many ice cream manufacturers already have blow molders on hand as they are used to make milk containers. While injection molding or other processes could be used, blow molding requires a less expensive mold than injection molding and results in a more economical procedure. Roughly speaking, a paper board or cardboard conventional half gallon brick container costs about 12¢ to 15¢. A conventional plastic tub for ice cream with printing thereon costs about 28¢ to 30¢. It is expected that the tray 100 and lid 102 manufactured in accordance with the present invention would have a cost of 13¢ or 14¢.

The tray 100 is approximately 7½ inches by 8 inches and 2 inches deep. The wall thickness is about 0.04 inches. This provides volume capacity for a half gallon of ice cream. These dimensions are chosen to optimize freezer utilization at retail and for the consumer. Other dimensions may be used. For instance, the depth may be increased and opening dimensions may be decreased to accommodate the manufacturing process or other needs. The trays can be manufactured at the site of ice cream manufacturer. This requires that an inventory of plastic raw material be kept. Plastic raw material is dense and easily stored, does not require refrigeration and has a long shelf life. Many ice cream producers already have the pellets on hand for making milk containers. Alternatively, the plastic trays can be manufactured offsite and a supply of blank trays shipped to the ice cream manufacturer at regular intervals. As blank trays contain no markings, flavors or brands or other product specific materials, one tray can be used for any brand or any flavor. The packaging inventory needs of an ice cream manufacturer are greatly eased. Trays 100 are provided to filler 32. The filler 32 is modified slightly from a conventional filler to completely fill the tray 100 in a quick automated manner. The filled trays are then sent to a cryogenic gas hardener 46. The cryogenic gas hardener 46 uses liquid nitrogen as the cooling agent. Nitrogen is liquid at atmosphere pressure at temperatures below −320° F. (−195.8° C.). Liquid nitrogen is sprayed directly on the ice cream in the container, extracting heat from it. The liquid nitrogen vaporizes and the cold vapor circulates within the hardener at extremely low temperature hardening the ice cream very quickly in a continuous process.

Cryogenic gas tunnel freezer are commercially available. One such unit is available from AGA AB, S-181 81 Lidingo, Sweden. These cryogenic gas freezers are available in a number of sizes and capacities and will accept products on belts between about 21.5 inches (0.55 meters) and 49 inches (1.25 meters) wide. Products up to 5.9 inches (0.15 meters) tall can be accommodated in these commercially available units.

Cryogenic gas freezers have previously been thought of as being economical in low to medium production volumes only. The cost of the gas and overall operating costs were thought to make use of such units with high volume production such as volume production of ice cream economically inappropriate. Applicants have found that the economies created in applicants' system more than overcome this apparent disadvantage in cryogenic gas hardening. The overall costs (including capital costs) of applicants' system using cryogenic gas hardening is less than competing systems.

The hardening time required of an ice cream product in applicants new trays 100 in cryogenic hardener 46 is 10 minutes or less. On a wide belt hardener, products can be arranged several products abreast going through the hardener. Hardening is accelerated because the trays are only two inches deep and have a top surface area measuring 7½ inches by 8 inches. The application by spraying cryogenic liquid onto the product has a large surface area upon which the cryogenic fluid may act and a small depth of material which requires cooling. Cryogenic chilling is enhanced. Additionally, cryogenic hardening occurs while the container is open. The cryogenic action occurs directly on the product. There is no insulating layer of packaging impeding hardening. Hardening times are reduced.

After exiting the hardener 46 the filled trays 100 proceed on conveyor 34 to a lidder 48 where lids 102 are applied closing the tray 100 and forming a closed container 104. A labeler 50 applies labels to the containers 104. The labels preferably are a flat sheet sized to fit on the lid 102 or they can be a sleeve adapted to enclose the container 104.

Alternatively, a flat sheet can be applied to the lid and the sleeve enclosing the whole container 104 is then applied. Importantly, labeling occurs after the ice cream product is completely manufactured, hardened and packaged. Up to this point, product is not brand specific. If a manufacturer wishes to make a production run of a certain amount of store brand vanilla ice cream followed by a production run of a certain amount of its own brand of vanilla ice cream, he simply puts the correct numbers of printed labels 106 for each brand in the labeler 50 and runs the production line. There is no need to stop for changeover of packaging or otherwise impair the manufacturing process. The labeled containers 104 are then shrink wrapped into multiple unit lots for ease in further processing at a shrink wrap station 22. The product is now ready to ship to a store. The entire process from filler 32 to shrink wrap 22 takes place in less than 20 minutes. Prior art systems required from a minimum hour and an half to 12 hours. Manufacture to order and shipping on the same day of order reception is now possible. The huge inventories and cold storage facilities required under the old system are greatly reduced. Cold storage and retention of products for hours, days or even weeks after completion becomes an option which can be avoided rather than a necessity in order to keep adequate stocks to meet retailer demand.

The cryogenic gas hardener can operate on liquid nitrogen or other cryogenic gases. As the operating gas in the cryogenic gas hardener is at an extremely low temperature, hardening the ice cream container before the lid is applied is hygienic. Moreover, the extremely rapid hardening produces an ice cream product having superior texture characteristics.

The container 104 is an integral part of the invention and improves the process disclosed in FIG. 1. The container 104 is shown in perspective in the opened condition in FIG. 3. The container 104 comprises a tray 100 and a lid 102. The tray 100 has a generally flat bottom 112, a left side 114, a right side 116, a head side 118, and a foot side 120. The corners where the four sides intersect all have a radius of curvature 122 of about one-half inch. The corners where the four sides intersect the bottom 112 all have a radius of curvature 124 of about one-half inch. The bottom 112 is generally flat but has a slight indentation 126. The indentation 126 occupies most of the area of the bottom 112. It is raised only about 1/16" (1.5 mm) with respect to the rest of the bottom. It adds stiffness and prevents bowing at the bottom.

The left side 114, right side 116 and head side 118 diverge slightly outwardly from bottom to top. This divergence is about 1° from vertical and provides necessary draft for molding and ejection of the tray from the blow molding die. This divergence is kept to a minimum so that the volume utilization in the cryogenic hardening and also in the storage freezers is maximized. There is very little air space between adjacent containers 104 when positioned next to one another. A rib 128 is provided near the top of the tray 100. The rib 128 is on the outside of all four side walls and provides engagement retaining the lid 102 on the tray 100.

The foot side 120 is provided with a foot protrusion 130. The foot protrusion 130 is very shallow, only about 1/16" (1.5 mm) deep. It extends over most of the width of the foot side 120 from the right side 116 to the left side 114. The foot depression 130 extends from the bottom 112 about three-fourths of the way to the open top 132 of the tray bottom 112. The outside surface 134 of the foot protrusion 130 is perpendicular to the bottom 112 of the tray.

Figure 9B:
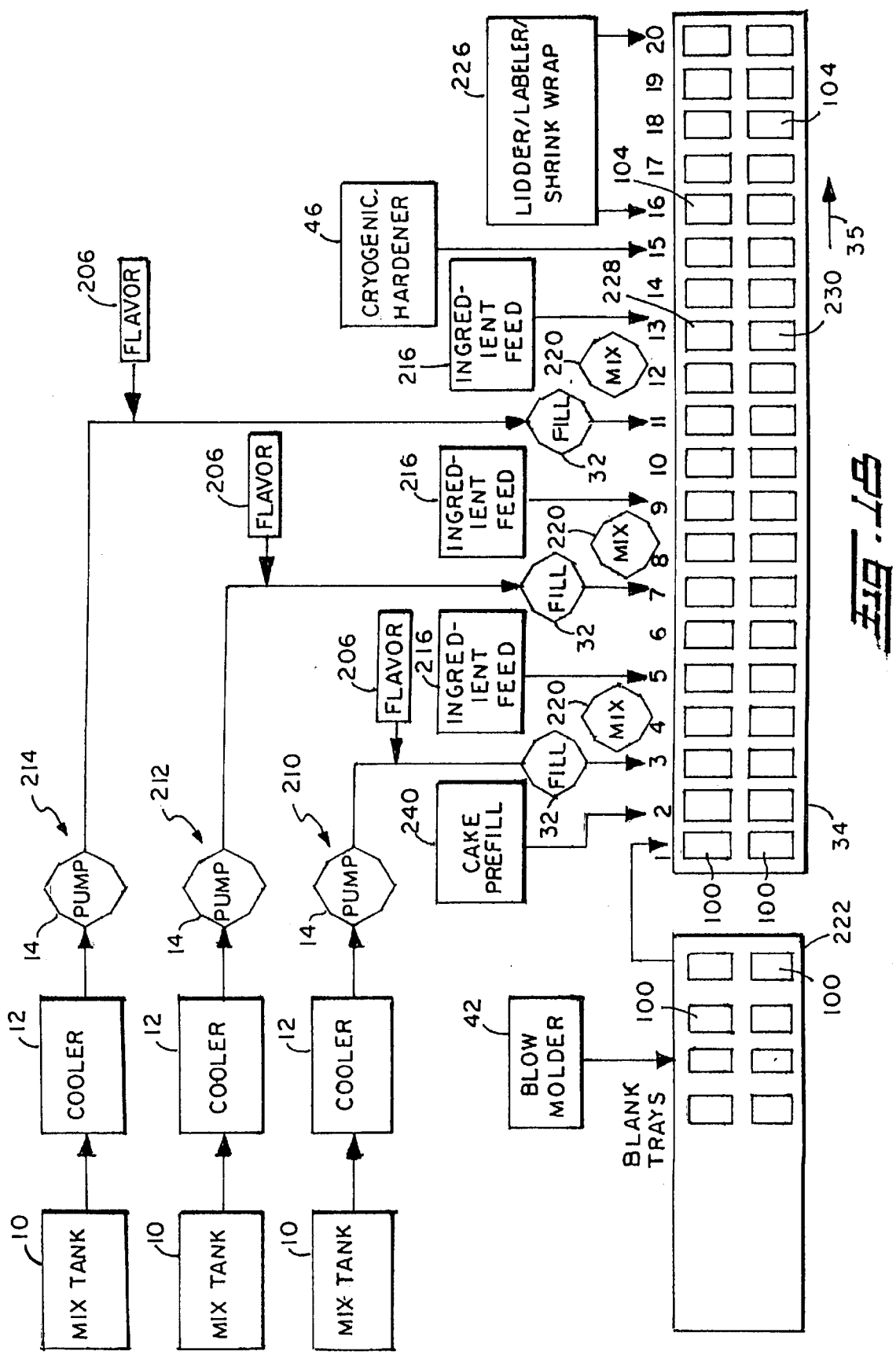
FIG. 9 is a cross section taken along line 9—9 of the lid seen in FIGS. 3, 7 and 8.

The lid 102 used with the tray 100 is shown in FIGS. 7, 8 and 9. The lid is sized and configured to fit snugly over the open top 132 of the tray 100. The lid has a generally flat top 140 and a downwardly extending flange 142 around its entire periphery. The lid 102 has a slight depression 144 occupying almost its entire area. The depression 144 is about 1/16" (1.5 mm) deep. In a half gallon size container in which the lid measures approximately 7½" by 8", the depression is a rectangle with rounded corners measuring approximately 7" by 7½". The depression 144 performs a number of functions. It stiffens the lid 140. It provides an aesthetically pleasing place in which to place a large label 146 (seen in FIG. 13). The depression 144 also accommodates the bottom of an identical container 104 when one container is placed upon another as seen in FIG. 10.

The flange 142 is of uniform height and, in the preferred embodiments, is about ½" (1.25 cm) high. The flange 142 may be provided with bumps or a continuous ridge 148 (FIG. 9 only) which will interact with the rib 128 on the tray 100 to hold the lid 102 on the tray and provide a sealing fit. The dimensions of the lid provide a tight, sealing fit to the top of the tray and the ridge 148 pulls the lid down on the tray.

As can be seen in FIG. 10, containers 104 stack stably one on top of the other. The depression 144 of the bottom tray accommodates the bottom 112 of the tray resting on top of it. FIG. 10 also illustrates a problem seen in the prior art overcome by the present invention. A body of ice cream 150 is contained in each container 104. A rigid lid 102 is applied to the container after the body of ice cream 150 is filled into the container. This leaves a slight air space 152 above the ice cream and below the lid 102. Air is a good insulator. In prior art processes in which round plastic tubs were used, the lid was applied to the tub prior to hardening. The lid and a layer of insulating air thereby separated the body of ice cream in the prior art container from the atmosphere in the hardener interfering with heat transfer and slowing the hardening process. In the present invention, hardening occurs before the lid 102 is applied to the tray 100. There is no insulating body of air interfering with hardening. Rather, the airspace provides insulation and helps retain hardness.

FIG. 11 illustrates how the container 104 can be stored and displayed vertically resting on its foot side 120. The outside surface 154 of the flange 142 and the outside surface 134 of the foot protrusion 130 are coplanar. Moreover, these two surfaces 134, 154 are perpendicular to the bottom and top of the container 104. A large flat surface, best seen in FIG. 12, is positioned under the center of gravity of the body of ice cream 150 and container 104. As can be seen in FIG. 12, the flat portion of the flange 142 extend downwardly from the top of the container over almost the entire width of the container. The outer surface 154 of the flange 142 extends downwardly almost to the top edge 156 of the foot protrusion 130. The foot protrusion 130 extends over almost the entire width of the foot side 120. A large, stable support surface is thereby provided. The support is sufficiently wide in both dimensions so that the container 104 will be stably supported even on wire frame type freezer shelves.

FIG. 13 shows the top 140 of the lid and container as it will be displayed vertically in a grocer's freezer. A large surface area facing the consumer is provided. An indented portion or depression 144 occupies all but the very edge of this surface portion and contains a printed label 106. The printed label 106 is brand and flavor specific. Printed label 106 can be printed on paper, transparent plastic film or any other desired substrate. The printed label 106 can be adhered to the lid 102 by means of an adhesive, heat welded or any other means desired. The printed label can be a decal as opposed to a traditional label which results in the appearance of printing directly upon the plastic lid. Only the printed label is brand and flavor specific. All other elements of the package are generic. In fact, the tray and the lid can be transparent or translucent allowing the consumer to see the product within the package. The label 106 can also have transparent or translucent portions allowing the consumer to see the item within the container 104 or a hole in the label may allow such viewing.

The above described container 104 in half gallon size is 7½" (19 cm) from left side 114 to right side 116. The package in half gallon size measures 8" (20.3 cm) from foot side 120 to head side 118. The container 104 is two inches deep. A traditional one half gallon cardboard brick package which measures 5" by 7" by 3½" deep. A significantly larger primary display panel is provided allowing better merchandising and more information to be conveyed to the consumer. Additionally, the low aspect ratio, that is the small depth when compared to the size of the principal display panel, aids in hardening as a thin wide body of ice cream can be chilled more quickly. Also the proportions of these dimensions improve freezer utilization at retail. A freezer can be set-up with five shelves from the bottom supporting six different flavors of ice cream one on top of the other and four different flavors of ice cream across the shelf. This provides 24 slots for 24 flavors or varieties. Each of the 24 slots can be stocked with up to 10 or 11 individual packages stood on their feet resulting in a pack out of from 240 to 264 units. The packages are tall enough so that even if one flavor sells very quickly so that consumers are reaching to select a second from the last next to a full slot, it can be done conveniently. With half gallon bricks, vertical freezer chests are traditionally stacked with five vertical layers (four shelves and the bottom) and four flavors across the shelf. Two half gallons of ice cream are stacked vertically on each shelf. This allows only the display of 20 flavors. Packages are stacked six deep resulting in a pack out of 240 units. If one attempted to put more shelves in and thereby allow display of more flavors, additional air space was introduced cutting down on freezer efficiency and capacity and it became more difficult for consumers to reach packages of ice cream toward the back. The traditional brick is only 3½" tall when displayed with its top faced up and only 5" tall when displayed with its top faced forward. A shelf closely accommodating either of these dimensions will present a tight fit for a consumer to reach toward the back for the last one or two of a particular flavor. Hence the common practice of stacking two on a shelf. Half gallon tubs are less efficient, resulting in a pack out of only about 120 units.

Larger size containers are also possible and advantageous with the present invention. For instance, a five quart container is 4½" deep and has a top surface with dimensions of 10" between the top and foot sides and 7½" between the left side and right side. These dimensions may be changed to accommodate manufacturing or other issues. Such a container is stable either horizontally disposed or vertically disposed. The five quart container has a large primary display panel for labeling. The five quart container is also less than 5.9" tall and can therefore be hardened effectively in the available cryogenic gas hardener described above.

The packaging described above also has consumer benefits. The corners between the side walls have a radius of curvature 122 of about one-half inch. The corners between the side walls and the bottom also have about a one-half inch radius of curvature 124. This makes scooping of the ice cream out of the corners and the bottom easier and allows the consumer to use all of the product contained in the package without making a mess. Additionally, the low aspect ratio that is the low proportion of depth of the container to the area of the open top, makes it less likely that consumers will soil their clothing when scooping ice cream out of the container. The container is also reusable. After the ice cream has been consumed, one is left with a plastic box with a close fitting lid of pleasing proportion and useful size. It is a simple matter to wash the container and use it as a container for food items to be frozen, refrigerated in a lunch box or otherwise. The proportions of the container are also favorable for storage in consumer freezers. This is a positive benefit while it is full of ice cream and after it has been recycled as a consumer container. The container full of ice cream can be stood up in a freezer door without difficulty. The containers can be nested in a freezer one on top of the other. The container can be placed on the bottom of a freezer compartment and other frozen foods stacked on top of it. With a cardboard brick, one had the risk of collapse of the top into the ice cream upsetting what was disposed on top of the ice cream. With the container of the present invention, a rigid container 104 having a flat lid 102 provides a stable support for subsequent layers. Moreover, the depression 144 in the lid 102 prevents items placed on top of the container 104 from sliding off of the container unintentionally.

One alternate embodiment of the process seen in FIG. 1 is shown in FIG. 14. All elements and steps in the process are the same except for those steps having to do with the lid 102. Lids are taken from a blow molder 42 and processed in a lid graphics applicator station 62. Graphics including trademark information, flavor information and other necessary markings, are applied to the lid 102 by means of application of a paper or plastic label or, decals or printing onto the lid. The lids 102 are then applied to the trays 100 by a lidder 48. Alternatively, lids are passed directly to the lidder 48 and applied to the trays 100. The lid graphics applicator then applies graphics as described in FIG. 1 or applies the graphics to a shrink wrap type label which is wrapped around the entire container 104. This process is illustrated with the broken line in FIG. 14. Finished, labeled containers 104 are then shrink wrapped into multi unit packs as desired for shipping, palletization or storage.

FIGS. 15–20 schematically illustrate other embodiments of ice cream manufacturing and packaging processes and systems according to the present invention wherein the pre-hardening stages are improved over prior systems. In these figures, like reference numerals have been used for like components. The systems and processes of these figures are illustrated in combination with the advances in hardening and packaging as discussed hereinabove; however, it will be appreciated that the pre-hardening process and system improvements disclosed are applicable to many ice cream manufacturing and packaging systems and processes including, for example, those not employing cryogenic hardeners, and/or those employing pre-printed ice cream containers.

Referring now to FIG. 15, another embodiment of an ice cream manufacturing and packaging system and process is shown in which multiple pre-hardening stages 200, 202, and 204 are illustrated as part of a process and system moving left to right along a conveyor 34 in the direction of arrow 35. Three such stages 200, 202, and 204, respectively, are provided, each including a mixing tank 10, cooler 12, pump 14, ingredient feed 16, and filler 32, connected in series for providing pre-hardened ice cream products to trays or shipping containers 100 traveling on conveyor 34. Three stages are shown; however, it is to be appreciated that any number of such stages can be used. Furthermore, although the ingredient feed 16 of stage 200 precedes that of stage 204, which in turn precedes that of stage 206 in FIG. 15, such stages may also be oriented side by side in a configuration lateral to the direction 35 of conveyor 34, thus allowing simultaneous filling of multiple trays 100 traveling side by side along conveyor 34. As in the system of FIG. 1, containers or trays 100 are provided to the system of FIG. 15 by blow molder 42 which itself is provided with a supply of plastic pellets 40 as raw material. Once containers 100 are filled by fillers 32, they are conveyed to a cryogenic gas hardener 46 for hardening of the ice cream products contained in the trays 100. After exiting hardener 46, the filled trays are moved by conveyor 34 to a lidder 48 where lids 102 are applied, thus closing tray 100 and forming a closed container 104. Labeler 50 subsequently applies labels to container 104, either on lid 102, or one or more of the outer surfaces of tray 100, or both. The labeled containers 104 can then be shrink wrapped at shrink wrap station 22 prior to shipment to the customer or storage. The system and process of FIG. 15 allows one or more of the pre-hardening stages 200, 202, and 204 to be dedicated to a particular type, flavor, or mixture of ice cream product, thereby reducing downtime and/or product waste for the overall system. In practice, one or more such pre-hardening stages may be dedicated to large batch processing, and one or more other pre-hardening stages can be dedicated to smaller batch runs. The net effect of the use of multiple stages is to reduce the total downtime by allowing large batch sizes particularly for the more popular ice cream flavors, and at the same time to reduce the time required to process a customer order. For example, if a three-stage system such as that shown in FIG. 15 is used to process a customer order for chocolate, vanilla, and a rare flavor like banana ice cream, stages 200 and 202 may be dedicated to production of chocolate and vanilla, respectively, because these are popular flavors. No downtime is incurred in stages 200 or 202, since they essentially run as continuous processes. Stage 204 may be dedicated to smaller batch jobs including rare flavors such as banana, with purging of the pre-hardening stage components between batches. The provision of stages 200 and 202 for the production of chocolate and vanilla means that stage 204, although dedicated to small batch runs, will never have to be shut down and purged for batches of chocolate or vanilla. The prior systems, such as that of FIG. 2, cannot achieve the same effective throughput or average order completion time of the new system because either large batches of chocolate and vanilla are periodically run, thus minimizing the downtime between flavors at the expense of average order completion time, or because frequent smaller batches of popular flavors like chocolate and vanilla swamp the system with downtime and product waste due to the increased frequency of changeovers. The provision of multiple pre-hardening manufacturing and processing stages such as are shown in FIG. 15, some of which can be dedicated to the production of popular flavors, therefore reduces the deleterious effects of unpredictable variation in customer flavor requirements without the requirement for large inventory costs or lengthy time from order receipt to shipment. It is typical for large ice cream manufacturers to offer several dozen flavors, as well as variants in added solid ingredients. It will be appreciated that adding further pre-hardening stages to the system of FIG. 15 further improves the performance.

In this system, the flavoring ingredients, not shown, may be added to mixing tank 10. Referring now to FIG. 16, a similar system is shown wherein each pre-hardening stage 200, 202, and 204 includes a flavor dispenser 206 between the pump 14 and the ingredient feed 16. In this system, purging of one pre-hardening stage to change from one flavor to another only involves the portion from pump 14 through the filler 32. Tank 10 and cooler 12 thus include only base material from which many flavors of ice cream can be made, depending on the particular flavoring supplied to dispenser 206. The system of FIG. 16 therefore further reduces the downtime and/or product waste associate with a flavor changeover from prior systems such as that shown in FIG. 2. In this regard, it will be further understood that flavor dispensers 206 are preferably capable of selectively dispensing one or more flavorings depending upon the desired end flavor mixture. For example, a dispenser 206 may hold cherry, strawberry, chocolate, blueberry, mint, vanilla, etc., flavoring ingredients, whether solid, semi-solid, or liquid, in individual compartments or chambers, not shown, within dispenser 206. Process controls, not shown, direct dispenser 206 to selectively dispense one or more of these flavoring ingredients according to customer order information. In this regard, customer order information includes information from customer purchase orders, databases of sales, inventory, etc., and/or requirements numbers output from a mathematical requirements predicting model, or the like. The systems of FIGS. 15 and 16, as well as those of FIGS. 17–20, are illustrated as including a labeler 50 for applying printed labels 106 as with the system of FIG. 1; however, it will be realized that alternate forms of providing package marking information may alternatively be employed, such as by use of a graphics applicator 62 as shown in FIG. 14 or other printing, marking, or labeling methods or systems as are known.

Further advantages are achievable with the system of FIGS. 17 and 17A, wherein one system is shown beginning with blow molder 42 providing trays 100 made from plastic pellets which travel along conveyor system 34 in the direction shown by arrow 35. Three pre-hardening sub-stages 210, 212, and 214 are illustrated, each including a mixing tank 10, a cooler 12, a flavor dispenser 206, and a filler 32, which together provide unhardened, flavored ice cream to trays 100. As above, the particular flavoring ingredient added to the product by dispenser 206 is selectively controlled according to the desired end product flavor.

Unlike the embodiments of previously discussed figures, the embodiment of FIG. 17 further includes ingredient feed 216 and an associated ingredient filler 218 separate from the pre-hardening sub-stages 210, 212, and 214, a separate ingredient feed 216 and associated filler 218 being provided downstream of each such pre-hardening sub-stage. Downstream of each ingredient feed 216, there is provided a secondary mixer 220. Ingredient feed 216 selectively provides solid ingredients such as cookies, candy, crackers, nuts, etc., and/or semi-solid or liquid ingredients such as caramel, fudge, peanut butter, chocolate, fruit products, cookie dough, sherbet, spices, marshmallow, and the like to the trays 100 to which ice cream has previously been added by fillers 32 as the trays 100 progress down conveyor 34. The addition of solid, semi-solid, or liquid ingredients through ingredient feed 216 and filler 218 is controlled based upon customer order information by process controls, not shown. Mixer 220 subsequently mixes either ice cream product and added ingredients, or just ice cream, depending on the contents of a given tray 100. Additionally, mixers 220 can be selectively controlled to provide mixing of less than the entire contents of trays 100 such as for example, mixing only a top portion or top layer of the contents thereof, as discussed further hereinafter. The provision of a separate ingredient feed 216 and filler 218 in association with each pre-hardening sub-stage 210, 212, and 214, respectively, allows further flexibility and reduction in downtime and the costs associated with purging, i.e. product scrap or waste, because a changeover from ice cream products having no solid added ingredients to products having such ingredients, or vice versa, does not require purging of solid, semi-solid, or liquid ingredient material, since the pre-hardening sub-stages 210, 212, and/or 214 do not include such materials. As with the other systems disclosed above, trays 100 containing selectively produced ice cream products are conveyed to the cryogenic gas hardener 46 and subsequently to lidder 48, labeler 50, and shrink wrap station 22, as discussed above, prior to shipment or storage.

A similar embodiment is shown in FIG. 18, wherein a multiple row conveyor system 34 is shown having 20 separate longitudinal tray positions, which conveyor system progresses in the direction of arrow 35. Blank trays are fed to conveyor 34 from a separate conveyor system 222 which itself receives the blank trays 100 from blow molder 42, in similar fashion to that shown in prior embodiments. Again, pre-hardening sub-stages 210, 212, and 214 are provided including fillers 32, each capable of selectively filling one or both trays in a row, such as for example, row 3 illustrated in FIG. 18 having two trays positioned therein. In this schematic illustration, blank trays 100 are inserted onto conveyor 34 in row 1, selective filling of ice cream product from pre-hardening sub-stage 210 is provided in row position 3, from pre-hardening sub-stage 212 in row position 7, and from sub-stage 214 in row position 11. Selective solid ingredient addition is provided by feeders 216 from stages 210, 212, and 214 in row positions 5, 9, and 13, respectively. Secondary mixers 220 are shown provided at row positions 4, 8, and 12; however, it will be recognized that mixers 220 can alternatively be provided at row positions 6, 10, and 14, if mixing of ice cream product and solid ingredients is desired subsequent to the addition to such solid ingredients by feeders 216. As with the embodiments discussed above, a cryogenic hardener 46 is provided in row position 15, followed by a lidder, a labeler, and a shrink wrap station, shown schematically as block 226 in FIG. 18. Each of the blocks shown in this schematic illustration in connection with a specific position thereon, may be selectively controlled to operate on one or both of the two row positions illustrated in FIG. 18. For example, ingredient feeder 216 shown in connection with row position 13 may be selectively operated to dispense solid, semi-solid, and/or liquid ingredients to the top tray 228 in row position 13, while dispensing no such ingredients to the bottom tray 230 in row 13. Likewise with the mixers 220, fillers 32, and with the lidder/labeler/shrink wrap station 226, as for example, different labels being applied to the top and bottom trays in a given row position.

Cake pre-filler 240 is further provided in the system and process of FIG. 18, shown in association with row position 2. Pre-filler 240 is controlled according to customer order information to selectively provide or not provide pre-filled food materials such as cake, crackers, crumble, nuts, graham crackers, etc. into the bottom of trays 100. In this way, the popular cake and ice cream food products may be fashioned. As an example, a customer order for one or more trays of cake topped with chocolate ice cream including walnuts, would be provided in the following manner. An empty tray 100 would be provided from conveyor 222 into row position 1 of conveyor 34. Preceding downstream, cake pre-filler 240 would provide cake to the bottom of tray 100 as it passed through row position 2. Flavor dispenser of pre-hardening sub-stage 210 would provide chocolate flavoring to the output of pump 14 and filler 32 associated therewith would fill an intermediate layer of tray 100 with chocolate ice cream as it passed through row position 3 on conveyor 34. Subsequently, ingredient feed 216 would selectively dispense walnuts into the top portion of the tray 100 as it passed through row position 5 on the conveyor 34. Optionally, the ice cream and walnuts could be mixed by one or both of the mixers 220 in row positions 8 or 12, selectively, without disturbing or mixing the lower layer of cake. Then the tray 100 would proceed through cryogenic hardener 46 and would eventually have a lid placed thereon, with labels and shrink wrap, as required by the customer order information or other product specification.

In FIG. 19, another embodiment is shown, similar to that of FIG. 18, wherein a single pre-hardening sub-stage 250 is provided with a mix tank 10, a cooler 12, and a pump 14, similar to those of the previous embodiments. Stage 250, however, provides unflavored ice cream to three separate fillers 32 as shown in FIG. 19. In addition, flavor dispensers 206 are placed separate from the pre-hardening sub-stage 250 and the fillers 32. Each dispenser 206 occupies a separate row position 4, 8, and 12, along conveyor system 34. In this system, a change of ice cream flavor, solid ingredient addition, and/or cake pre-fill, requires no system purging, no downtime, and thus, no product waste, upon changeover from one flavor or variant to another. As trays pass from row positions 1–20, they may selectively be filled with cake in a first layer using pre-filler 240, ice cream in a second layer from fillers 32 in row position 3, flavoring is added by dispenser 206 in row position 4, solid ingredients are added to another layer by feeder 216 in row position 5, and the top, top and middle, and/or top, middle and bottom layers may be selectively mixed by mixer 220 in row position 6. Pre-filler 240, fillers 32, flavor dispensers 206, ingredient feeders 216, and mixers 220 each are controlled by process controls, not shown, in accordance with the desired product mix based upon customer order information, as are the labels and/or other printing or marking applied in lidder/labeler/shrink wrap station 226.

The use of a single hardening sub-stage 250 in this system provides further manufacturing advantages in that only one mix tank 10 need be kept full with base material, with the flavoring ingredients being added by dispensers 206 after the ice cream material has already been added to the trays 100. As most ice cream flavors can be derived from base ice cream material with the flavoring ingredients added subsequently, there is no need, with the system of FIG. 19, to provide large mixing tanks filled with flavored ice cream. The system achieves small batch capability, indeed, the capability of providing single packages of hundreds of different combinations of pre-fill, flavor, solid, semi-solid, and/or liquid ingredients, mixing, at the assembly line level of conveyor 34, while maintaining what amounts to a continuous process for the pre-hardening sub-stage 250. The manufacturer must provide a continuous supply of raw materials to mixing tank 10, pre-fill materials to pre-filler 240, plastic pellets to blow molder 42, solid, semi-solid, and/or liquid ingredients to feeders 216, and flavoring additives to dispensers 206, as well as printed labels to the labeler of unit 226. Other than this requirement, once the customer order information is entered into or determined by the control system, not shown, the process of FIG. 19 can run continuously. Because customer orders can be filled in their entirety, the ice cream products coming off the assembly process from conveyor 34 may be packed onto skids and shipped directly to the customer, without the need for intermediate temporary storage facilities which were required under prior systems, and/or the use of partial shipments.

Figure 20:
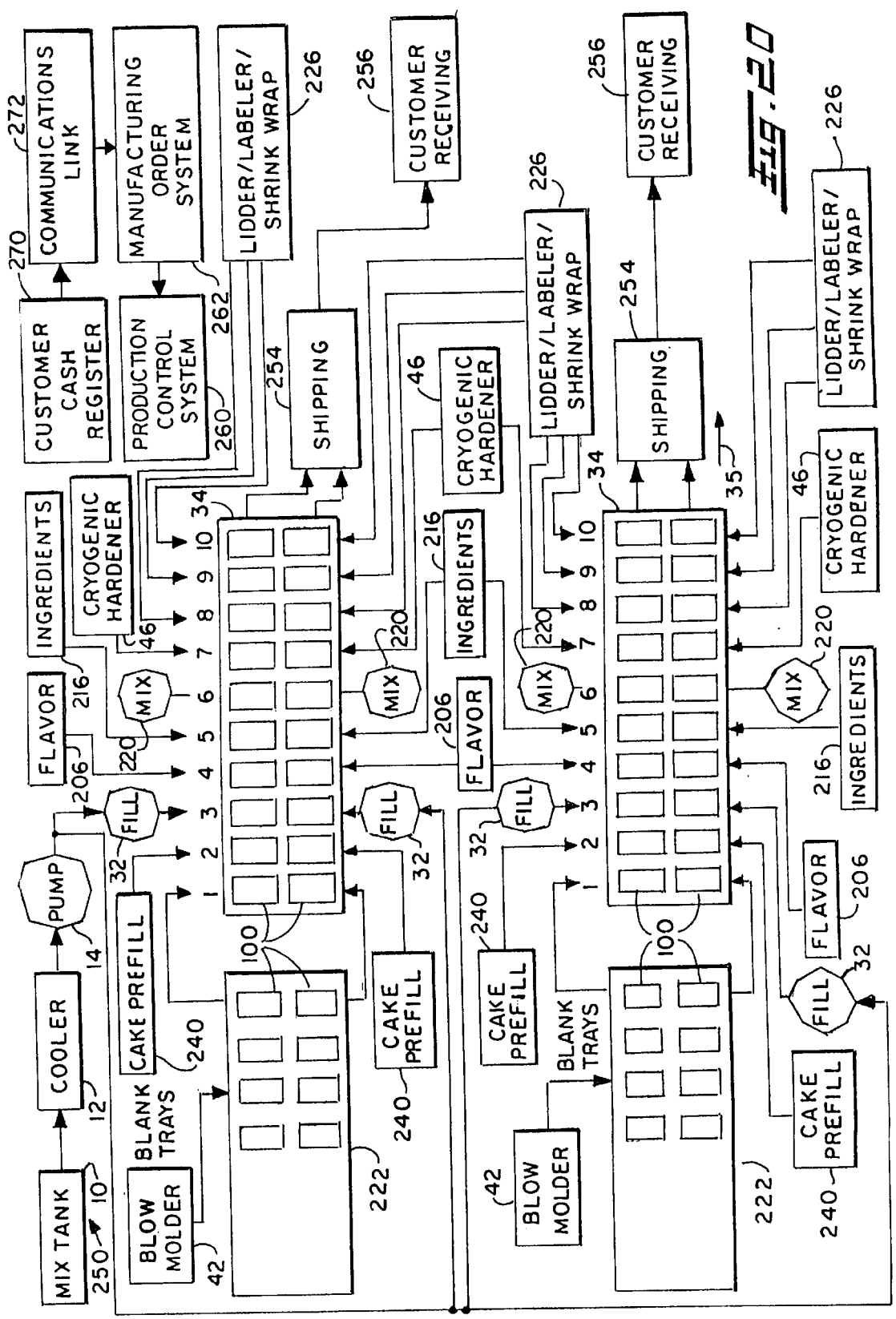
FIG. 20 is a schematic diagram showing yet another variation in the process as shown in FIGS. 1 and 14–19.

Referring now to FIG. 20, wherein yet another embodiment of an ice cream manufacturing and packaging process and system is illustrated schematically including a single pre-hardening sub-stage 250 with mixing tank 10, cooler 12, and a pump 14, providing a base unhardened ice cream product to four fillers 32 positioned at row positions 3 on either side of two dual row conveyors 34. Blow molders 42 provide blank trays 100 to conveyors 222 positioned ahead of and in line with conveyors 34 and providing trays 100 into row position 1 on either side of both conveyors 34. Pre-fillers 240 selectively provide a pre-fill layer of cake, crumble, crackers, etc. to the trays 100 in row position 2 of conveyors 34 according to customer order information. Fillers 32 in row position 3 then add ice cream product from pump 14 selectively in an amount determined by the customer information. Flavor dispensers 206 add flavoring ingredients or additives according to the customer information in row position 4 of conveyor 34, and solid, semi-solid, or liquid ingredients such as nuts, candy, cookies, fruit, Jell-O, spices, caramel, fudge, peanut butter, etc. may be subsequently added by ingredient feeders 216 to trays 100 in row position 5. Mixers 220 then mix selectively one or more layers of added materials in trays 100 at row position 6 on conveyor 34 prior to hardening of the ice cream product by cryogenic hardener 46 at row position 7. Lids, labels, and shrink wrap are then selectively added by unit 226 in row positions 8, 9, and 10.

The finished ice cream products are then transferred to shipping station 254 for shipment to customer receiving docks 256. Production control system 260 monitors and controls the operation of one or more of blow molder 42, conveyor 222, tank 10, cooler 12, pump 14, cake pre-fillers 240, conveyor system 34, fillers 32, flavor dispenser 206, ingredient feeders 216, mixers 220, cryogenic hardeners 46, and the lidder/labeler/shrink wrap unit 226 in accordance with customer order information received through manufacturing order system 262, thereby allowing individual packages of ice cream products to be essentially custom-made to specific customer requirements, while allowing the overall process and system to operate continuously. It will be further appreciated that the various row positions may be changed in any conceivable order where, for example, solid ingredients are added to trays 100 prior to addition of flavoring by dispensers 206.

Order system 262 preferably receives customer order information from customer cash registers 270 through communications link 272, which may include one or more electronic communications media such as for example, telephone lines with modems, as well as communications through computer networks such as for instance, the world-wide web, etc. Alternatively, the customer order information may be received by order system 262 from customer maintained databases, not shown, such an inventory spreadsheets or other forms of databases. In this instance, order system 262 may periodically poll the customer database and/or cash registers 270 for information relating to recent sales of ice cream products and/or inventory totals thereof, through communications links such as 272; however, other methods are contemplated including periodic downloads of customer order information through communications link 272 from cash registers 270, or databases maintained by the customer, not shown, which downloads are controlled periodically or asynchronously by the customer. In a further form a data transfer, each sale of an ice cream product processed by a customer cash register 270 may initiate communications with manufacturing order system 262 a short time after the sale is processed, thereby achieving real time updates of customer ice cream product requirements without the need for human intervention. Order system 262 and/or production control system 260 may be programmable with threshold order requirement amounts according to customer purchasing and inventory control goals, whereby manufacturing order is generated when a customer inventory reaches a certain threshold level and/or when a certain number of a specific product have been sold. In addition, the production controls 260 and/or order system 262 may optionally contain mathematical models which are updated with customer order information received from the customer through links 272. Many variations are possible with the system of the present invention. In this fashion, a retail grocer servicing the consuming public may avoid large buffer inventory costs and overhead by virtue of the manufacturer achieving a just-in-time delivery system using the present invention. Furthermore, the manufacturer may reduce or eliminate on-site storage of finished ice cream products because the present system allows production of an entire customer order as a single batch, even though it may contain many variants of ice cream products, thus allowing immediate shipment of the finished ice cream product order. The reduction in both customer and manufacturer inventory or storage of finished ice cream products reduces the effective product age upon receipt in the customer receiving 256. This system thus achieves lower costs for both manufacturer and customer, as well as improved product quality and freshness. It will be recognized that in the system of FIG. 20 as well as other embodiments shown in previous figures, conveyor systems 34 and 222 may include more than one or two rows of trays and further, that many different ingredients and/or layers thereof may be selectively added to the trays as they pass through the process or system. In this fashion, a finished ice cream product may include cake on a bottom layer, a second layer of ice cream, a third layer of liquid, semi-solid, or solid food ingredients, and a further top layer including ice cream with or without nuts, for instance. The possible variations are numerous.

Figure 21:
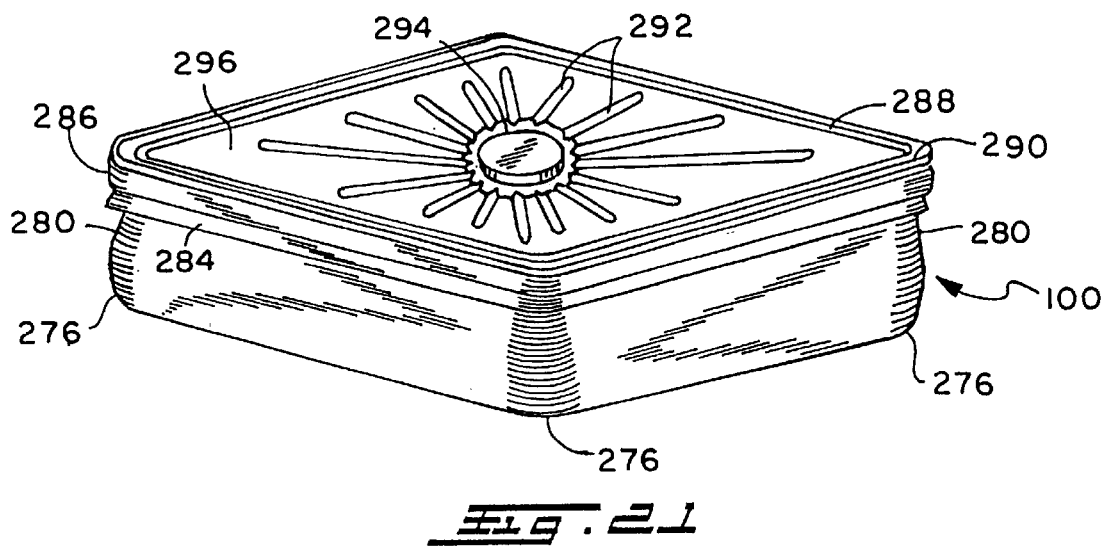
FIG. 21 is a perspective view of a variation of the tray and lid as shown in FIG. 3; and, FIG. 22 is a partial side elevation view in section of the tray and lid as shown in FIG. 21.
Figure 22:
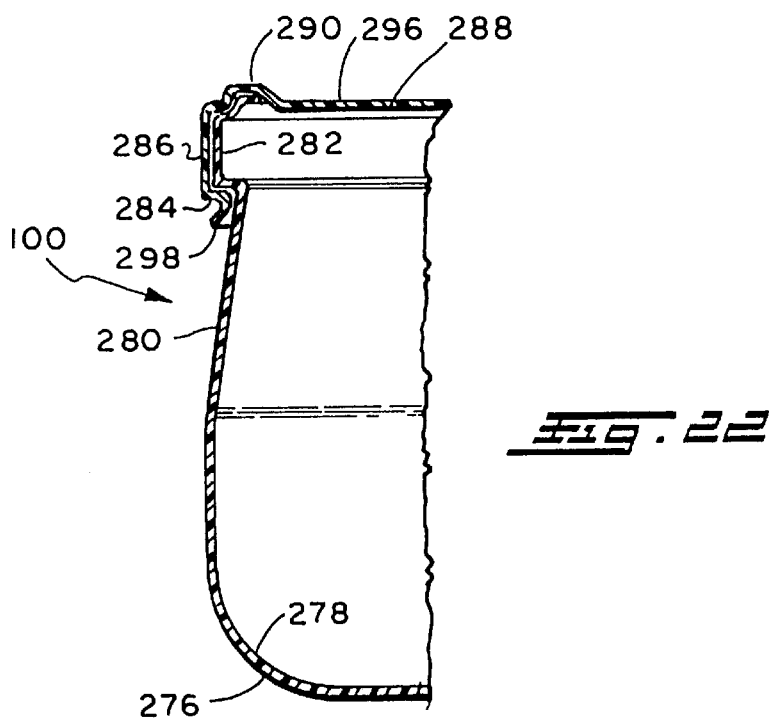

Referring now to FIG. 21, another embodiment of shipping container or tray 100 is illustrated, having rounded outer edges 276 and corresponding rounded inner edges 278 as further shown in FIG. 22. The rounded edges 278 allow ease of use by the end product consumer in removing all contents of the container with the rounded edge of a spoon, and further allows the use of secondary mixers 220 as shown in the embodiments of FIGS. 17–20, which can selectively mix one or more layers of ice cream product while in the containers 100. Containers 100 further include tapered edge 280 and upper lip 282 providing a seal for interengaging with lower lip 284 and outer vertical sidewall 286 of lid 288. Lid 288 further includes an upwardly extending protrusion 290, and indented radially aligned ribs 292, extending radially outward from circular indentation 294. Flat portion 296 of lid 288 extends between protrusions 290 and provides a flat surface for the addition of printed labels 106 and/or other forms of marking or printing, as discussed previously. Lid 288 further includes grasping surface 298 at the bottom of lower lip 284, thus allowing an end consumer to easily remove lid 288 from tray 100.

While considerable emphasis has been placed herein on the structures of the preferred embodiments and processes and on the interrelationships between these structures and the steps in that process it will be appreciated that many modifications and alterations can be made in the embodiments herein illustrated and described without departing from the principles of the invention. In particular, other very fast hardening methods allowing one to harden an open container before application of a label may be substituted for the nitrogen gas cryogenic gas hardening described above. Further, changes to details of the structure of the container 104 which still allow the container to be labeled after hardening are possible. Many other variations of the preferred process and structure are and will be used in accordance with the present invention. Accordingly, it is to be distinctly understood that the foregoing descriptive matter is to be interpreted merely as illustration of the present invention and not as a limitation. Obviously, modifications and alterations will occur to others upon the reading and understanding of the specification. It is intended to include all modifications insofar as they come within the scope of the appended claims or the equivalents thereof.

Having thus described the invention, it is claimed:

1. A process for manufacturing and packaging a variety of ice cream products on a processing line comprising:
   filling liquid raw materials into at least one mixing tank;
   cooling said liquid raw materials to a temperature near the freezing point of water whereby said liquid raw materials becomes a first ice cream product;
   providing a supply of open topped, unlabeled, multiple serving trays;
   filling first selected of said unlabeled trays with said first ice cream product;
   applying lids and label information to said first selected trays, thereby creating closed multiple serving containers of said first ice cream product;
   creating at least a second ice cream product, having characteristics different from said first ice cream product;
   filling second selected of said unlabeled trays with said second ice cream product; and,
   applying lids and label information to said second selected trays, thereby creating closed multiple serving containers of said second ice cream product.

2. The process of claim 1, wherein at least said first ice cream product and said second ice cream product are hardened in a cryogenic hardener.

3. The process of claim 1, wherein a selected number of unlabeled trays is provided and the selected number of said unlabeled trays is controlled by at least the total volume of said first ice cream product and said second ice cream product.

4. The process of claim 1, wherein the number of said unlabeled trays provided is independent of the quantity of a particular flavor and brand of ice cream product created and dependent only on the total quantity of ice cream product created.

5. A process for manufacturing and packaging a variety of ice cream products on a processing line comprising:
   filling liquid raw materials into at least one mixing tank;
   cooling said liquid raw materials to a temperature near the freezing point of water, whereby said liquid raw materials becomes a first ice cream product;
   said first ice cream product is created in a volume dependent on customer order information;
   providing a supply of open topped, unlabeled, multiple serving trays;
   filling first selected of said unlabeled trays with said first ice cream product;
   applying lids and label information to said first selected trays, thereby creating closed multiple serving containers of said first ice cream product;
   creating at least a second ice cream product having characteristics different from said first ice cream product, in a volume dependent on said customer order information;
   filling second selected of said unlabeled trays with said second ice cream product; and,
   applying lids and label information to said second selected trays, thereby creating closed multiple serving containers of said second ice cream product.

6. The process of claim 5, wherein selected of said unlabeled trays are filled with at least said first ice cream product or said second ice cream product until said volume of said first ice cream product and said second ice cream product have complied with said customer order information.

7. The process of claim 5, wherein selected of said unlabeled trays are filled with at least said first ice cream product or said second ice cream product until said first and said second ice cream product is depleted.

8. The process of claim 5, wherein selected of said unlabeled trays are filled with at least said first ice cream product or said second ice cream product until said first and said second ice cream product is changed.

9. The process of claim 5, wherein said unlabeled trays are provided as needed.

10. The process of claim 5, wherein said lids are provided as needed.

11. The process of claim 5, wherein said label information is printed in accordance with customer order information comprising selected quantities of labels for said first ice cream product and said second ice cream product.

12. The process of claim 11, wherein said label information is printed concurrent with said process for manufacturing and packaging a variety of ice cream products.

13. The process of claim 11, wherein said label information is printed subsequent to said process for manufacturing and packaging a variety of ice cream products.

14. The process of claim 5, whereby said unfilled, open topped, unlabeled, multiple serving trays are continued to be provided in said process for manufacturing at the time of ice cream product changeover.

15. The process of claim 5, whereby said unfilled, open topped, unlabeled, multiple serving trays are not loaded onto said process for manufacturing at the time of ice cream product changeover.

16. The process of claim 5, whereby said lids are continued to be provided in said process for manufacturing at the time of ice cream product changeover.

17. The process of claim 5, whereby said lids are not loaded onto said process for manufacturing at the time of ice cream product changeover.

18. A process for manufacturing and packaging a variety of ice cream products in accordance with integrated customer order information on a processing line comprising the steps of:
   creating a first ice cream product from liquid raw materials in at least one mixing tank;
   said first ice cream product is created in a volume dependent on integrated customer order information;
   providing a plurality of unlabeled multiple serving trays having open tops;
   introducing said first ice cream product through said open tops of first selected of said unlabeled multiple serving trays;
   providing a plurality of lids for said trays;

applying selected of said lids to said first selected of said multiple serving trays;

applying label information to said first selected of said multiple serving containers;

creating at least a second ice cream product, having characteristics different from said first ice cream product;

said second ice cream product is created in a volume dependent on integrated customer order information;

introducing said second ice cream product through said open tops of second selected of said unlabeled multiple serving trays;

applying selected of said lids to said second selected of said multiple serving trays; and, applying label information to said second selected of said multiple serving containers.

19. The process of claim 18, wherein at least said first ice cream product and said second ice cream product are created in quantities dependent on said integrated customer order information.

20. The process according to claim 18, wherein at least said first ice cream product and said second ice cream product are created in a flavor dependent on integrated customer order information.

21. The process of claim 18, wherein said label information is introduced subsequent to the filling of selected trays with at least said first and said second ice cream products.

* * * * *